United States Patent [19]

Taylor et al.

[11] 4,084,229
[45] Apr. 11, 1978

[54] CONTROL STORE SYSTEM AND METHOD FOR STORING SELECTIVELY MICROINSTRUCTIONS AND SCRATCHPAD INFORMATION

[75] Inventors: Donald R. Taylor, Framingham; Arthur A. Parmet, Waltham, both of Mass.

[73] Assignee: Honeywell Information Systems Inc., Waltham, Mass.

[21] Appl. No.: 644,777

[22] Filed: Dec. 29, 1975

[51] Int. Cl.² .................. G06F 9/16; G06F 13/00
[52] U.S. Cl. .................................................. 364/200
[58] Field of Search ............ 340/172.5; 445/1; 364/200

[56] References Cited

U.S. PATENT DOCUMENTS

| | | | |
|---|---|---|---|
| 3,293,610 | 12/1966 | Epperson et al. | 364/200 |
| 3,380,025 | 4/1968 | Ragland | 340/172.5 |
| 3,391,394 | 7/1968 | Ottaway et al. | 340/172.5 |
| 3,434,112 | 3/1969 | Yen | 340/172.5 |
| 3,560,933 | 2/1971 | Schwartz | 340/172.5 |
| 3,646,522 | 2/1972 | Furman et al. | 340/172.5 |
| 3,828,320 | 8/1974 | Dinerman et al. | 340/172.5 |
| 3,859,636 | 1/1975 | Cook | 340/172.5 |
| 3,872,447 | 3/1975 | Tessera et al. | 340/172.5 |
| 3,900,835 | 8/1975 | Bell et al. | 340/172.5 |
| 3,911,406 | 10/1975 | McLaughlin et al. | 340/172.5 |
| 3,914,747 | 10/1975 | Barnes et al. | 340/172.5 |

*Primary Examiner*—Melvin B. Chapnick
*Attorney, Agent, or Firm*—Faith F. Driscoll; Nicholas Prasinos; Ronald T. Reiling

[57] ABSTRACT

A system and method for providing a control store arrangement in which a single memory having a plurality of memory locations can be used for storing sequences of microinstructions or scratch pad information. The number of storage locations defining the scratch pad area can be increased or decreased as required by assigning tag addresses to a desired number of scratch pad storage locations when the microinstruction routines are being assembled. In this manner, the locations defining the scratch pad areas can be tailored to the particular system operation to be performed. This eliminates the need for modifying the control store circuits to change the size of the control store scratch pad area.

25 Claims, 16 Drawing Figures

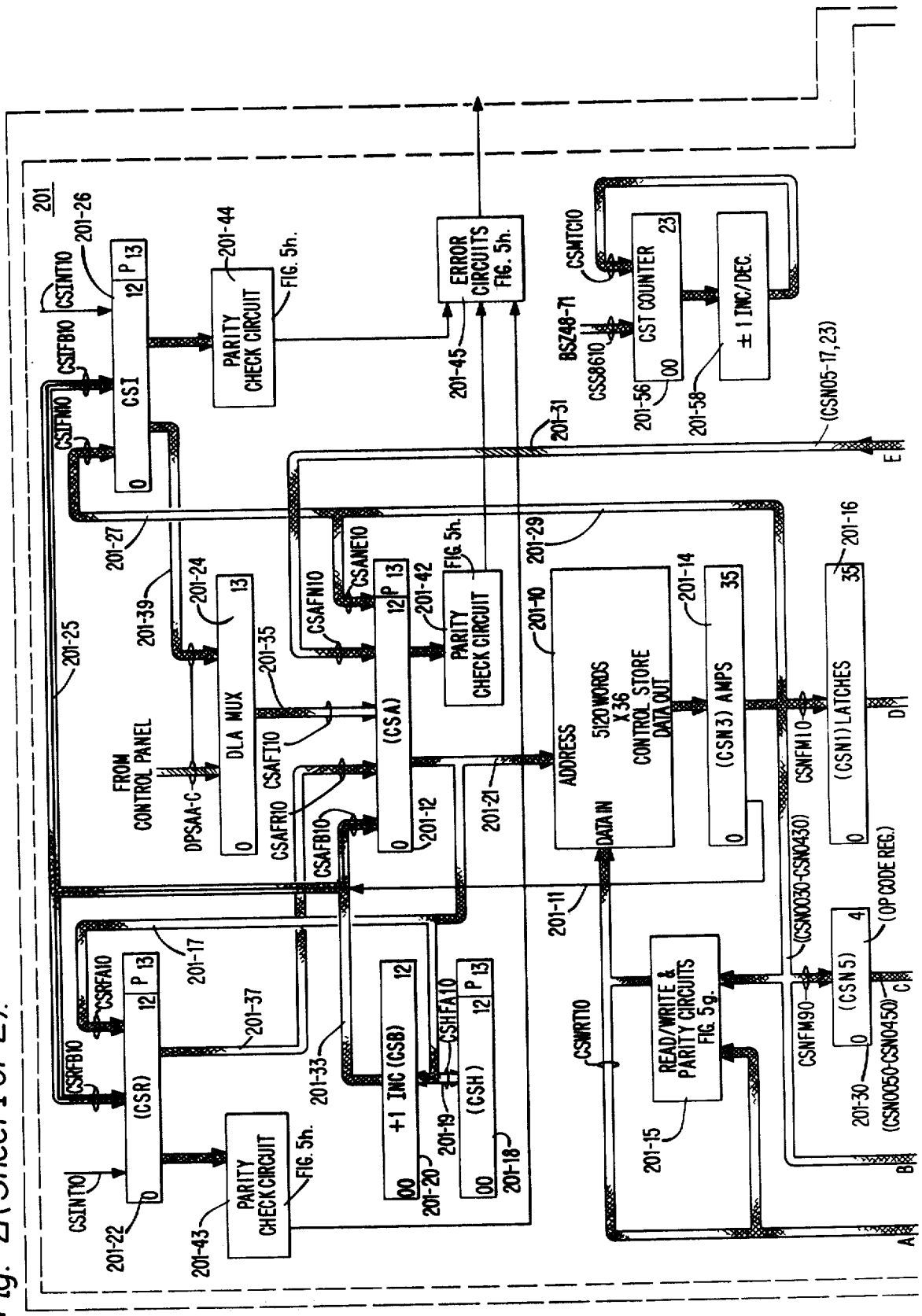
Fig. 2 (Sheet 1 of 2).

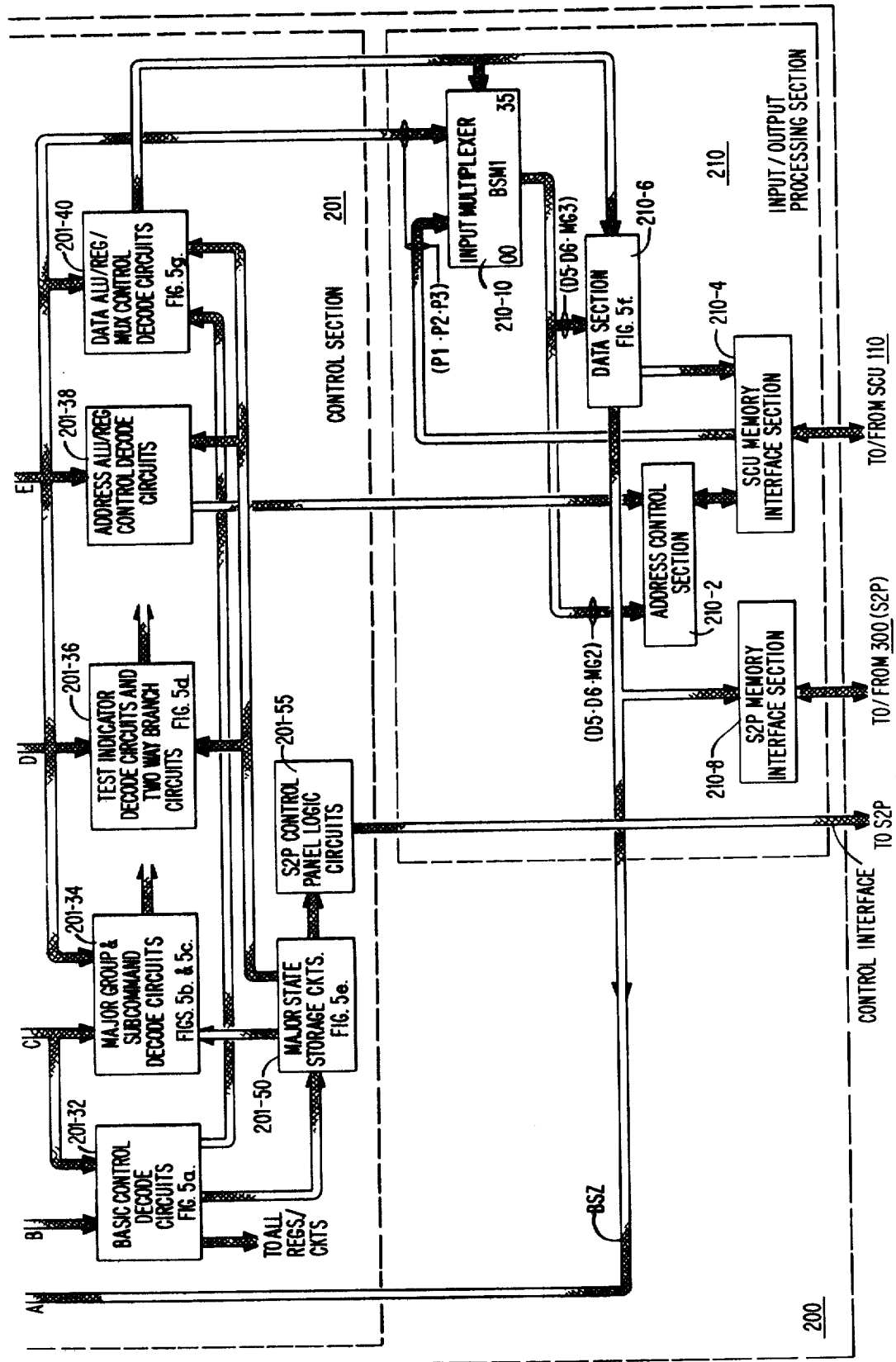
Fig. 2(Sheet 2 of 2).

MICROINSTRUCTION FORMATS

| MAJOR GROUP | µ INST. | BIT → 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|---|
| | | OP CODE | | | | OPERANDS | | | | | | | | | | | | | | | | | | | | | | | | | | | CHECK BITS | | | | |
| | | | | | | | | | | | | | | | | | | | | | | | | | | | | | | | | | PI | P0 | P1 | P2 | P3 |
| 0 | NOOP | 0 | 0 | 0 | 0 | | | | | | | | | | | | | | | | | | | | | | | | | | | | | | | | |
| 1 | MMRO | 0 | 0 | 0 | 1 | K0 | K1 | K2 | K3 | K4 | Z1 | Z2 | Z3 | Z4 | 0 | 0 | 0 | 0 | R | PG | LIM | S6 | S6 | 0 | 0 | S7 | S7 | S8 | S8 | S8 | | | | | | |
| 2 | ARCA | 0 | 0 | 1 | 0 | M1 | M2 | M3 | M4 | M5 | C1 | 0 | D1 | D2 | 0 | 0 | P1 | P2 | P3 | D5 | D6 | S6 | S6 | D7 | D8 | S7 | S7 | S8 | S8 | S8 | | | | | | |
| | ARCL | 0 | 0 | 1 | 1 | M1 | M2 | M3 | M4 | M5 | 0 | 0 | D1 | D2 | 0 | 0 | P1 | P2 | P3 | D5 | D6 | S6 | S6 | D7 | D8 | S7 | S7 | S8 | S8 | S8 | | | | | | |
| 3 | DRCA | 0 | 1 | 0 | 0 | M1 | M2 | M3 | M4 | M5 | C1 | 0 | D1 | D2 | D3 | D4 | P1 | P2 | P3 | D5 | D6 | P4 | P5 | P6 | D7 | D8 | S7 | S7 | S8 | S8 | S8 | | | | | | |
| | DRCL | 0 | 1 | 0 | 1 | M1 | M2 | M3 | M4 | M5 | 0 | 0 | D1 | D2 | D3 | D4 | P1 | P2 | P3 | D5 | D6 | P4 | P5 | P6 | D7 | D8 | S7 | S7 | S8 | S8 | S8 | | | | | | |
| | LDC | 0 | 1 | 1 | 0 | C23 ••• C26 | | | | | C1 | C2 | C3 | C4 | C5 | C6 | C7 | C8 | C9 | C10 | C11 | C12 | C13 | C14 | C15 | C16 | C17 | C18 | C19 | ••• | C22 | | | | | | |
| 4 | DCK1 | 0 | 1 | 1 | 1 | S1 | S1 | S2 | S2 | S3 | S3 | S4 | S4 | S5 | S5 | 0 | 0 | S6 | S6 | 0 | 0 | S7 | S7 | S8 | S8 | S8 | | | | | | |
| | DCK2 | 1 | 0 | 0 | 0 | S9 | S9 | S9 | S10 | S10 | S11 | S11 | S12 | S12 | S13 | S13 | S6 | S6 | 0 | 0 | S7 | S7 | S8 | S8 | S8 | | | | | | |
| 5 | CBOTN | 1 | 0 | 0 | 1 | A0 | A1 | A2 | A3 | A4 | A5 | A6 | A7 | A8 | A9 | A10 | A11 | 0 | T1 | T1 | T1 | T1 | T1 | PA | T2 | T2 | T2 | T2 | T2 | 0 | | | | | | |
| | CBOTE | 1 | 0 | 1 | 0 | A0 | A1 | A2 | A3 | A4 | A5 | A6 | A7 | A8 | A9 | A10 | A11 | 0 | T1 | T1 | T1 | T1 | T1 | PA | T2 | T2 | T2 | T2 | T2 | 0 | | | | | | |
| | CBRTN | 1 | 0 | 1 | 1 | A0 | A1 | A2 | A3 | A4 | A5 | A6 | A7 | A8 | A9 | A10 | A11 | A12 | T1 | T1 | T1 | T1 | T1 | PA | T2 | T2 | T2 | T2 | T2 | 0 | | | | | | |
| | CBRTE | 1 | 1 | 0 | 0 | A0 | A1 | A2 | A3 | A4 | A5 | A6 | A7 | A8 | A9 | A10 | A11 | A12 | T1 | T1 | T1 | T1 | T1 | PA | T2 | T2 | T2 | T2 | T2 | 1 | | | | | | |
| 6 | LCSIK | 1 | 1 | 0 | 1 | A0 | A1 | A2 | A3 | A4 | A5 | A6 | A7 | A8 | A9 | A10 | A11 | A12 | 0 | 0 | S6 | S6 | S6 | 0 | S7 | S7 | S7 | S8 | S8 | S8 | | | | | | |
| | UCBK | 1 | 1 | 1 | 0 | 0 | 0 | 0 | 0 | 0 | 0 | 0 | 0 | 0 | 0 | 0 | 0 | 0 | S6 | S6 | S6 | 0 | S7 | S7 | S7 | S8 | S8 | S8 | | | | | | |
| | UBRK | 1 | 1 | 1 | 1 | 0 | 0 | 0 | 0 | 0 | 0 | 0 | 0 | 0 | 0 | 0 | 0 | 0 | S6 | S6 | S6 | 0 | S7 | S7 | S7 | S8 | S8 | S8 | | | | | | |
| 7 | RTNFI | 1 | 1 | 1 | 0 | 0 | 0 | 0 | 0 | 0 | 0 | 0 | 0 | 0 | 0 | 0 | 0 | 0 | S6 | S6 | S6 | 0 | S7 | S7 | S7 | S8 | S8 | S8 | | | | | | |
| | RTFIR | 1 | 1 | 1 | 1 | 0 | 0 | 0 | 0 | 0 | 0 | 0 | 0 | 1 | 0 | 0 | 0 | 0 | S6 | S6 | S6 | 0 | S7 | S7 | S7 | S8 | S8 | S8 | | | | | | |
| | RTNER | 1 | 1 | 1 | 0 | 0 | 0 | 0 | 0 | 0 | 0 | 1 | 0 | 0 | 0 | 0 | 0 | 0 | S6 | S6 | S6 | 0 | S7 | S7 | S7 | S8 | S8 | S8 | | | | | | |
| | RTFRR | 1 | 1 | 1 | 1 | 0 | 0 | 0 | 0 | 0 | 0 | 1 | 0 | 1 | 0 | 0 | 0 | 0 | S6 | S6 | S6 | 0 | S7 | S7 | S7 | S8 | S8 | S8 | | | | | | |
| | CSMR | 1 | 1 | 1 | 0 | 1 | 0 | 0 | 0 | 0 | 0 | 0 | 0 | 0 | 0 | 0 | 0 | 0 | S6 | S6 | S6 | 0 | S7 | S7 | S7 | S8 | S8 | S8 | | | | | | |
| | CSMW | 1 | 1 | 1 | 1 | 0 | 0 | 0 | 0 | 0 | 0 | 0 | 0 | 1 | 0 | 0 | 0 | 1 | S6 | S6 | S6 | 0 | S7 | S7 | S7 | S8 | S8 | S8 | | | | | | |

Fig. 3.

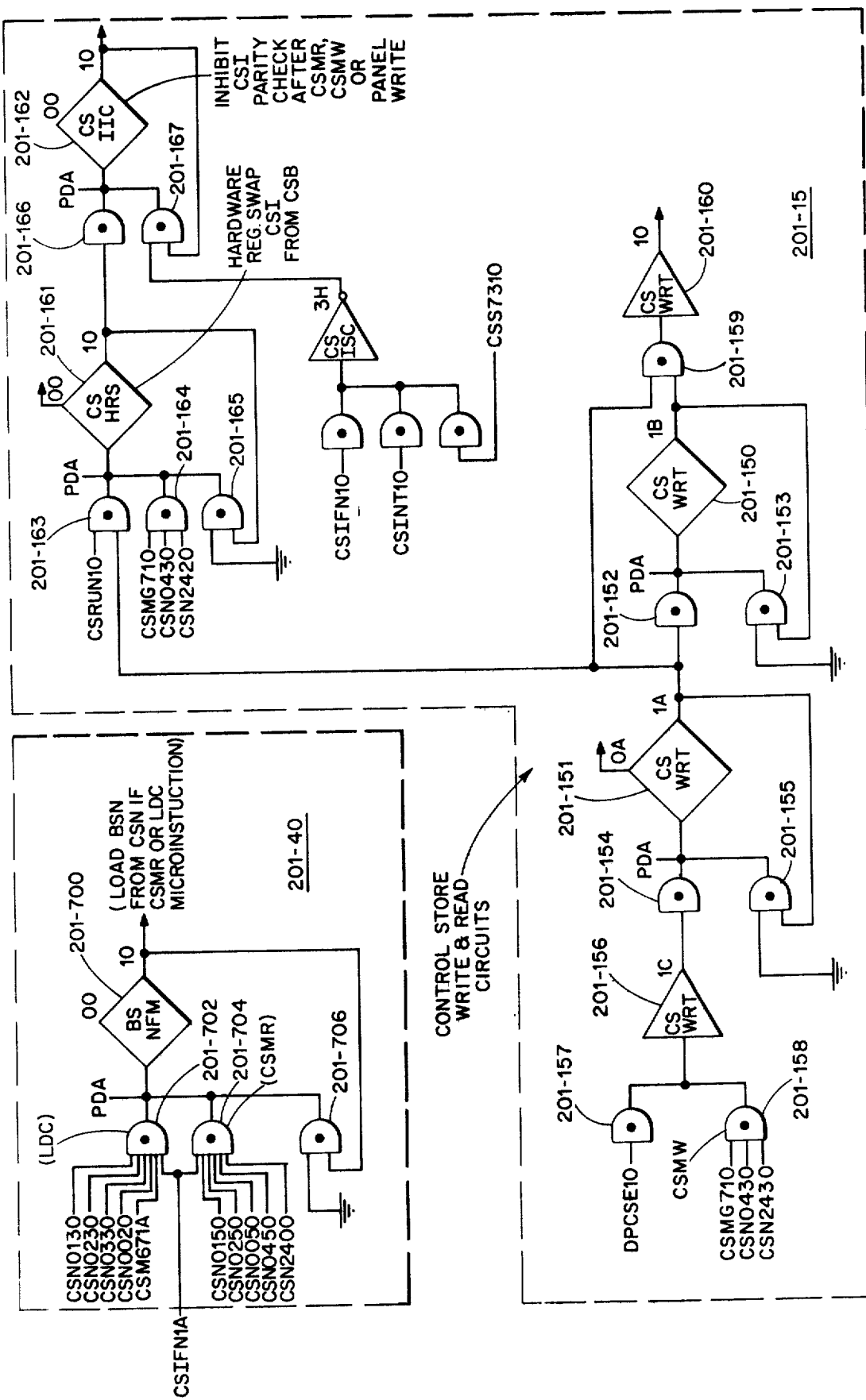
Fig. 5g. (sheet 1 of 2)

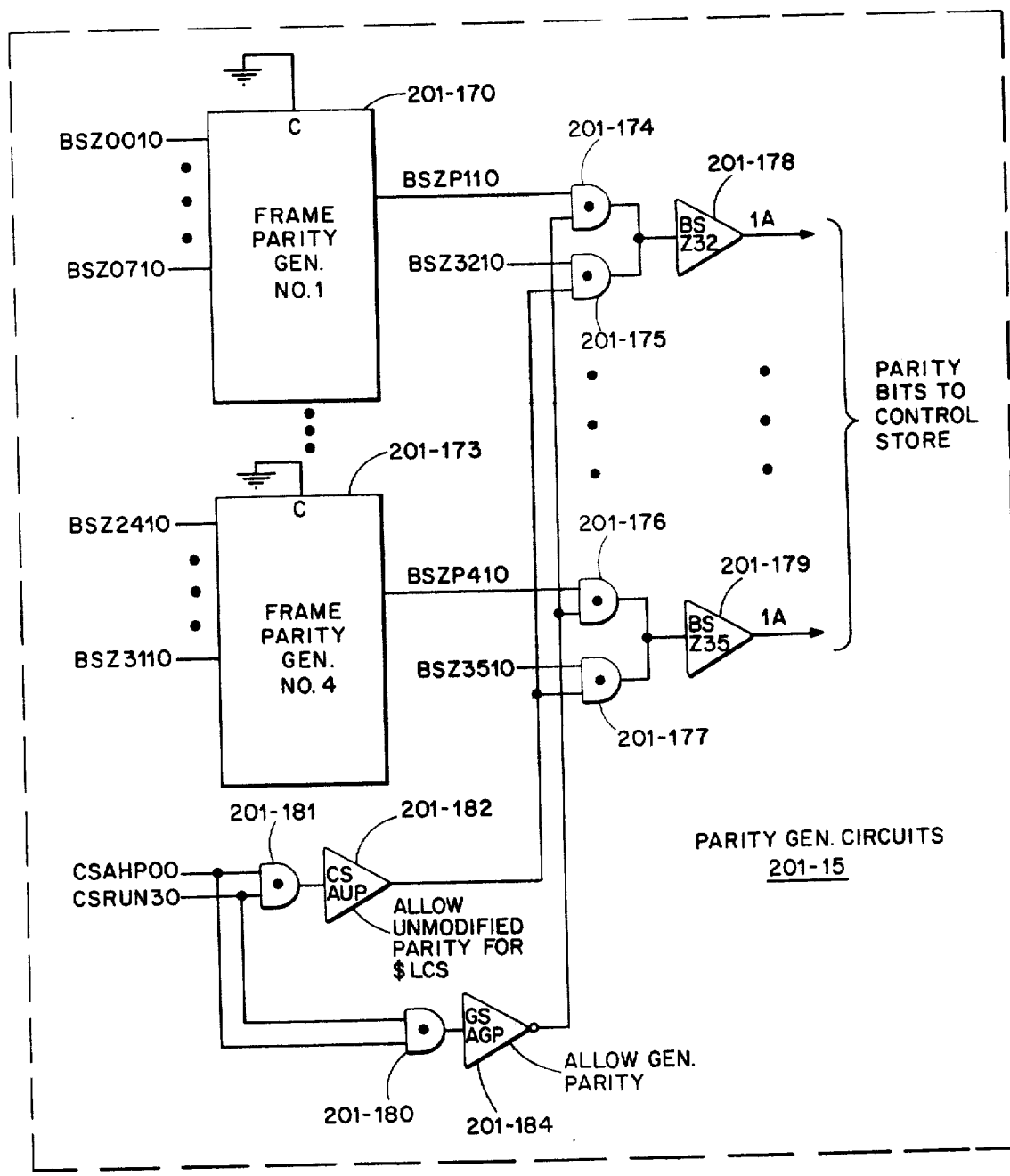
Fig. 5g. (sheet 2 of 2)

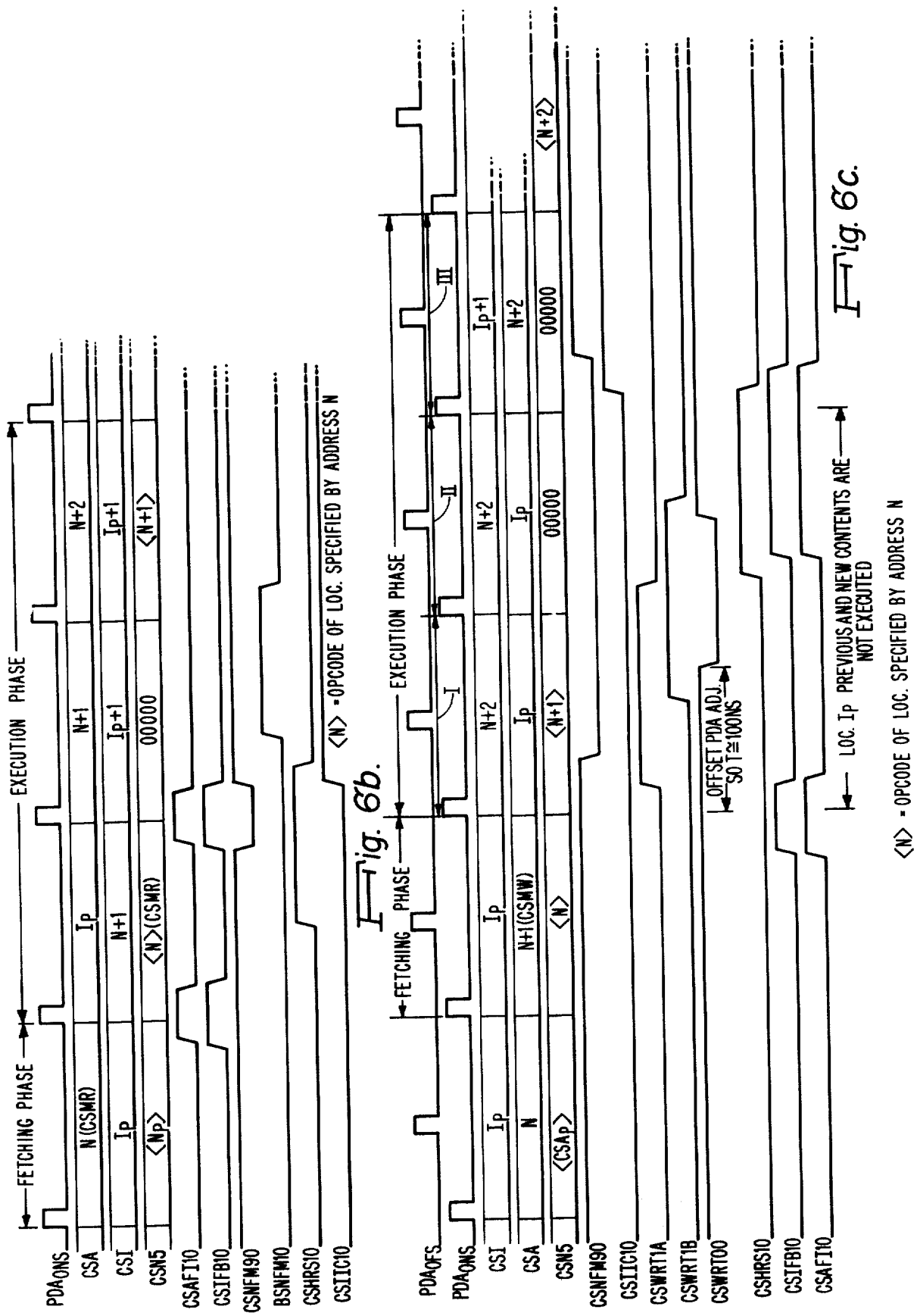

CONTROL STORE SYSTEM AND METHOD FOR STORING SELECTIVELY MICROINSTRUCTIONS AND SCRATCHPAD INFORMATION

BACKGROUND OF THE INVENTION

1. Field of Use

The present invention relates to microprocessing systems and, more particularly, to a control store system for executing commands received from a data processing system.

2. Prior Art

In general, there are a number of arrangements for programmed control units for executing commands. These units normally include a separate scratch pad memory used for storing parameter information in addition to providing temporary storage for control and data handling operations. An example of this type of arrangement may be found in U.S. Pat. No. 3,913,074, invented by John A. Homberg et al., which is assigned to the same assignee as named herein.

The main disadvantage of these types of arrangements is that they require additional storage circuits to provide the necessary scratch pad storage locations. Also, such arrangements require circuits to insure that the cycle times of the control store and scratch pad memories are properly synchronized to one another. This can increase the complexity of the control and timing of the microprogrammed processing unit.

Accordingly, it is a primary object of the present invention to provide an improved microprogrammed control unit.

It is a further object of the present invention to provide a microprogrammed control unit which requires a minimum of apparatus for storing signals required for transferring data between a main memory unit and a utilization device.

SUMMARY OF THE INVENTION

These objects are achieved in a preferred embodiment of the present invention which comprises a microprogrammed processing unit including an addressable control store unit having a plurality of storage locations, each of which can provide storage for microinstructions (firmware), each including an op code portion or scratch pad storage. In accordance with the present invention, prior to assembling the firmware code, the number of storage locations for defining a scratch pad area can be increased or decreased by defining the desired number of locations with a tag or word name designating that location as a scratch pad location.

More particularly, the information to be stored in the control store is coded symbolically and this code is converted into appropriate patterns of ONES and ZEROS which are then loaded into the control store. The size of the scratch pad area is established by symbolically indicating the desired number of storage locations which are to form a scratch pad area for a given operation. In the present arrangement, an all ZERO pattern is loaded into each such storage location together with the appropriate check bits.

During operation, an address register conditions the control store for fetching microinstruction words for transfer to output registers for decoding by decoding circuits. Microinstructions coded to specify the reading or writing of scratch pad locations inhibit the interpretation of the contents of such locations as microinstructions, and instead interpret such contents as scratch pad data. This precludes op code decoding and generation of subcommand signals for normal register transfers. Instead, it enables a location specified by a second address register to be accessed for reading or writing the contents thereof. In the preferred embodiment, the scratch pad address corresponds to the contents of the second address register previously loaded under microprogram control prior to execution of the read or write type microinstruction. Means are provided for automatically incrementing the scratch pad address subsequent to the fetching of each read or write microinstruction. This arrangement enables a number of sequentially designated scratch pad locations to be written without requiring the further loading of the second register under microprogram control.

From the above, it is seen that the same control store locations which store microinstructions during the performance of one type of operation can also provide scratch pad storage during another type of operation. This becomes desirable where a microprogrammed processing unit is required to execute test routines prior to performing tasks associated with normal operations. Therefore, storage locations which are used as scratch pad storage during normal operations are loaded with microinstructions of different test routines. Following the completion of the testing operations, the locations are then coded as mentioned above to provide a scratch pad storage wherein these locations then provide working storage for address and data received from main storage needed for the execution of commands.

By eliminating the need for a separate scratch pad memory, the arrangement of the present invention enables the microprogrammed processing unit to perform microinstruction execution and scratch pad storage operations within the cycle time. This reduces the complexity of the control and timing circuits normally used to perform such operations.

More importantly, the area of scratch pad storage can be varied in the manner discussed above without necessitating changes in the address control circuits of the control store. Therefore, when it is necessary to increase the scratch pad area, as, for example, in order to provide for certain capabilities such as a paging facility, this only requires the defining of a greater number of unused storage locations in the control memory as part of the scratch pad area.

The novel features which are believed to be characteristic of the present invention both to its organization and method of operation together with further objects and advantages will be better understood from the following description when considered in connection with the accompanying drawings. It is to be expressly understood, however, that these drawings are for the purpose of illustration and description only and are not intended as a definition of the limits of the present invention.

BRIEF DESCRIPTION OF THE DRAWINGS

FIG. 2 shows in greater detail the processor interface adapter 200 of FIG. 1.

FIG. 3 shows the different microinstruction formats executed by the adapter 200.

FIGS. 5a through 5i show in greater detail different ones of the blocks of FIG. 2.

FIGS. 6a through 6c are timing diagrams used in describing the operation of the present invention.

GENERAL DESCRIPTION OF THE HOST SYSTEM OF FIG. 1

Figure 1:
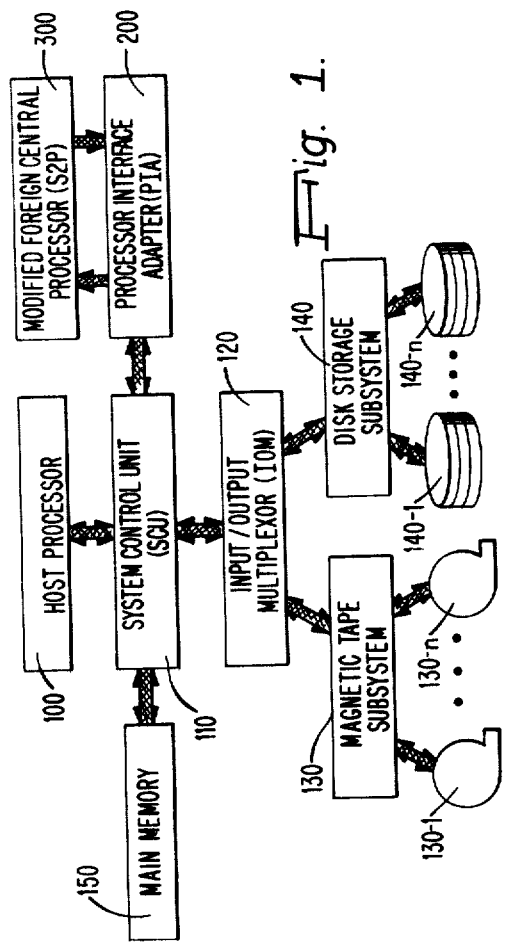
FIG. 1 shows in block diagram form a system which incorporates the principles of the present invention.

FIG. 1 illustrates a data processing system which includes the method and apparatus of the present invention. Referring to the figure, it is seen that the system includes a host processor 100 which couples to a system control unit (SCU) 110 which enables different units within the system to access any one of a number of memory modules included within main memory 150. In addition to coupling to a number of different ports of main memory 150, the system control unit also couples to a number of ports of an I/O controller or multiplexer (IOM) 120 which controls the operation of a number of input/output devices by means of subsystems 130 and 140, as shown in FIG. 1. The subsystem 130 controls a plurality of tape drives 130-1 through 130-n. The subsystem 140 controls a plurality of disk devices 140-1 through 140-n.

For the purposes of the present invention, the units 100 through 150 may take the form of the systems disclosed in U.S. Pat. No. 3,413,613, and U.S. Pat. No. 3,514,772. The management control subsystem or operating system software for supervising and managing the operation of the data processing system referenced above in the preferred embodiment may take the form of the system described in U.S. Pat. No. 3,618,045.

It will be noted from FIG. 1 that the system includes a central processor (S2P) 300 which couples to a processor interface adapter (PIA) 200. The processor 300 may, for the purposes of the present invention, be considered conventional in design. For example, it may take the form of the processing unit described in a publication "Model 3200 Summary Description" published by Honeywell Inc., copyrighted 1970, order number 111.0015.000.1-C52. Additionally, reference may also be made to U.S. Pat. No. 3,323,110, invented by Lewis G. Oliari et al., and U.S. Pat. No. 3,811,114, invented by Richard A. Lemay et al., both of which are assigned to the assignee of the present invention.

The processor interface adapter 200 is a microprogrammed processor which serves as a data and control interface between the foreign central processor 300 and the host system, enabling the system to emulate target system programs. The adapter 200 directly connects to one of the ports of the system control unit 100 such that no "hardware" modifications to the overall system are required. In carrying out the many operations necessary to enable the processor 300 to execute directly certain types of instructions of a target system program, the adapter 200 is required to perform a number of different operations. The adapter 200 makes use of the present invention in order to minimize the complexity and storage requirements of the microprogrammed processing unit.

General Description of Processor Interface Adapter 200

FIG. 2 illustrates in block diagram form the processor interface adapter 200. Referring to the figure, it is seen that the adapter 200 includes a control section 201 and an input/output processing section 210.

The control section 201, the most pertinent section to the present invention, provides subcommand signals for controlling the operation of the processor 300 in response to commands received from host processor 100.

More specifically, this section generates subcommand signals which control the processor 300, transfer data to and from main memory 150, and control a control panel utilized by processor 300.

The input/output processing section 210 includes the interface circuits which couple the adapter 200 to the SCU 110, the control panel, and data lines of the processor 300. This section performs the various data manipulation operations, and memory addressing operations which take place either under the control of the control section 201 or under the control of processor 300. These two main sections will now be discussed in greater detail.

Control Section

Referring to FIG. 2, it is seen that this section includes a control store 201-10 which is organized to have a maximum of 5120 words, each word containing 36 bits. The control store organization is showed diagrammatically in FIG. 4. As seen from the figure, the lower 1024 locations designated by octal addresses 00000 through 01777 include four read only memory (ROM) circuit boards, each nine bits in width. These storage locations store a number of basic hardware logic test (BLT) microprograms which are used to perform preliminary testing of the adapter circuits and control section, to gain access to main memory 115, and to load the other sections of control store 110 with verification routines and "personality" (normal operating) microprograms or firmware.

Figure 4:
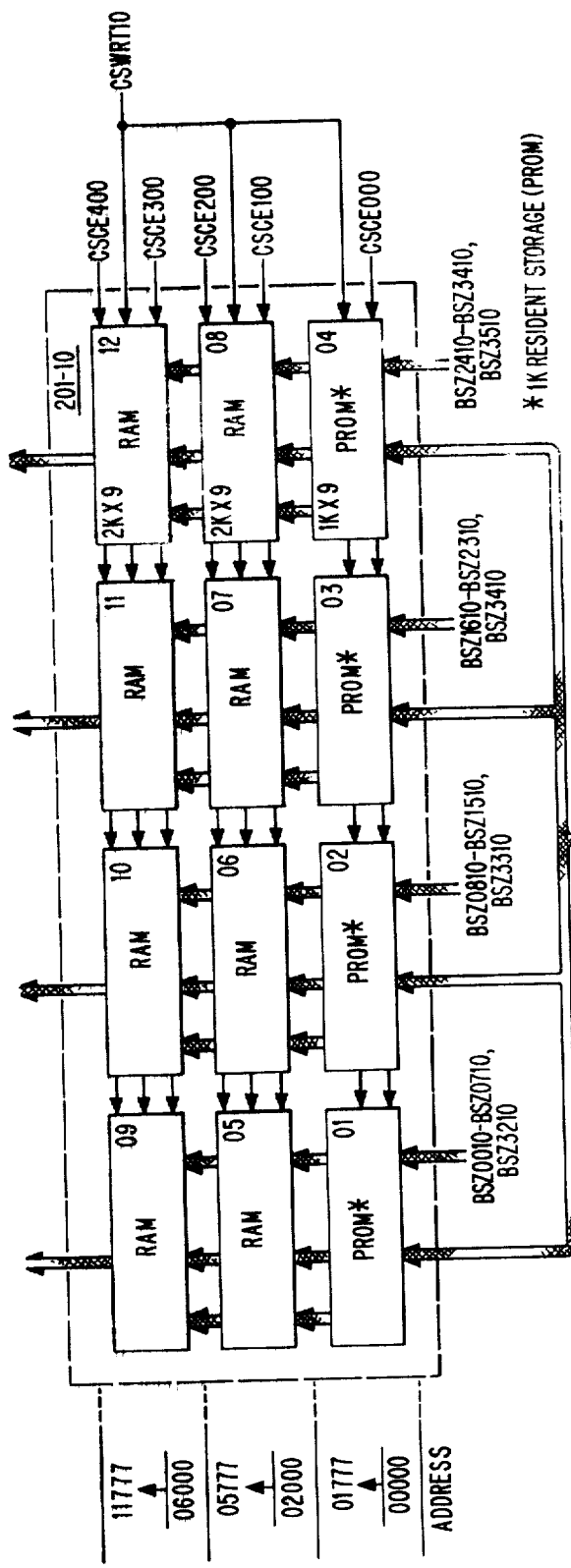
FIG. 4 shows the organization of the control store 201-10 of FIG. 2.

As seen from FIG. 4, the remaining storage locations designated by octal addresses 02000 through 11777 comprise up to two sections of writable storage locations (RAM). These locations store the verification routine "overlays" and personality firmware loaded by a microprogram loader routine also stored in the read only memory section of control store 201-10. To minimize the amount of storage locations required, the verification routines are divided into a number of different load and execute sequences which are overlayed with one another until, finally, the personality firmware is loaded into control store 201-10. Form the purposes of the present invention, the control store is constructed utilizing conventional circuits which may include circuits of the type disclosed in the publication "The Integrated Circuits Catalog for Design Engineers", published by Texas Instruments, Inc., dated 1972.

As seen in FIG. 4, the complement or negation of the signals CSA03000–CSA1200 from a memory address register (CSA) 201-12 is applied to each of the ROM circuit packages since each package includes a buffer inverter circuit in series with each address line which inverts the input address signal. Both the assertions and negations of the address signals from register 201-12 are used as inputs to the RAM chips.

The signals CSCE000 through CSCE400 are chip enable signals which are generated in response to decoding the high order address bits of CSA register 201-12 (i.e., bits 00–02). When generated, these signals condition the appropriate ROM or RAM package, enabling access to one of the storage locations of the control store 201-10. A write pulse CSWRT10 is also applied as an input to each chip enabling the signals applied to BSZ0010 through BSZ3510 to be written into a selected storage location. It will be noted that FIG. 4 shows the CSWRT10 signal also being applied to the ROM chip blocks which allows for installation of RAM packages in place of ROM packages for maintenance purposes, when necessary. For further information as to the type of circuits used to provide the enabling signals, reference may be made to U.S. Pat. No. 3,911,406, which is assigned to the same assignee as named herein.

The contents of an accessed storage location are read out via an input bus to a plurality of amplifier circuits of block 201-14. These circuits provide early data output signals CSN0030 through CSN3530 which represent valid signals 139 nanoseconds after the occurrence of a clock pulse. A four megahertz system clock, not shown, generates the clock pulses or PDA pulses which establish the basic timing for the system. For the purposes of the present invention, the clock may be considered conventional in design.

Figure 5A:
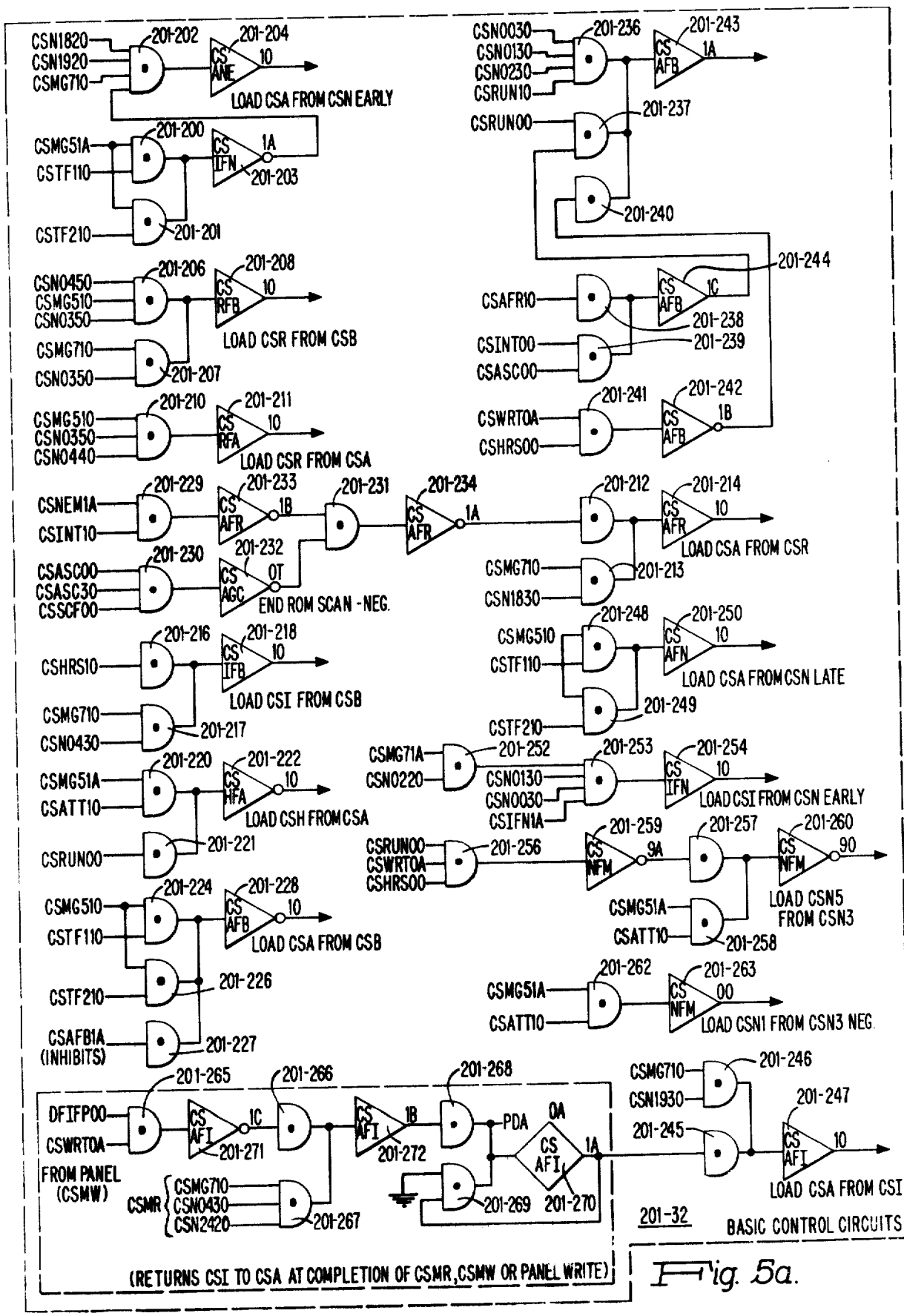

All early register transfer subcommand signals are decoded by circuits included in block 201-32, shown in detail in FIG. 5a, from the signals appearing as outputs from block 201-14. The output signals CSN0030 through CSN3530 are transferred to a 36 bit local memory register corresponding to the latch circuits of block 201-16 in response to a subcommand signal CSNFM00 which is generated by circuits included in block 301-32. Additionally, the output signals CSN0030 through CSN0430 are transferred to a five bit position op code register 201-30 in response to a subcommand signal CSNFM90 generated by the circuits of block 201-32. As explained herein, with reference to FIG. 5a, signal CSNFM90 is normally a binary ONE except when a conditional branch and a no execute condition is present preventing execution of the next microinstruction, or when the system is placed in a STOP mode or during execution of a read or write type microinstruction.

The register 201-30 always stores the op code of the current microinstruction being executed. Thus, bit signals CSN0050–CSN0450 are derived from CSN0010–CSN0410.

The register 201-16 always stores the contents of the control store location addressed by the address contained in CSA register 201-12 during the previous clock cycle. The output signals from local register 201-16 are applied to a plurality of decoder circuits of blocks 201-34, 201-36, 201-38, and 201-40 for decoding of all subcommands, data delivery and multiplier control signals, test fields, etc. The output signals from op code register 201-30 are applied to decoder circuits included in block 201-34 which generate major group decode signals and subcommand inhibit signals for inhibiting certain transfer operations, as explained herein.

As seen from FIG. 2, the circuits of block 201-34 receive signals from a block 201-50 which includes a number of state flip-flops for establishing a number of different modes of operation for adapter 200. Each state flip-flop is set or reset by subcommand signals generated by the circuits of block 201-32 or from bits within the microinstructions themselves. The output signals from different state flip-flops are applied as inputs to the control panel circuits of block 201-55. These circuits generate signals on a control interface for controlling the operation of S2P processor 300 via the control panel interface logic circuits normally included as part of the S2P processor 300. For example, these circuits enable the enter/display of the S2P processor program/interrupt counters included in its control memory, the operation of the S2P processor in a single instruct, RUN and STOP modes, the clearing and initialization of the S2P processor, and the changing of the address mode and sense switch settings of the S2P processor.

The circuits also supply signals to a maintenance/control panel which provides for all external operator or maintenance facilities necessary to control system operation.

The operation of these circuits will be described only to the extent necessary for a complete understanding of the present invention. However, for information regarding the type of operations mentioned, reference may be made to U.S. Pat. No. 3,909,802, and U.S. Pat. No. 3,813,531, both of which are assigned to the same assignee as named herein.

It will be noted from FIG. 2 that the early data output signals are also applied as inputs to the circuits of block 201-15, to CSA register 201-12, and to a control store interrupt (CSI) register 201-26. The output signals condition write control circuits of block 201-15, shown in detail in FIG. 5g, to generate a write pulse signal CSWRT10. In response to certain types of microinstructions, as explained herein, the circuits of block 201-32 force corresponding ones of the subcommand signals CSANE10 and CSIFN10 to binary ONES which in turn load CSA register 201-12 and CSI register 201-26, respectively, with bit signals CSN05–CSN17 and CSN23 via transfer paths 201-29 and 201-27. It will also be noted that CSA register 201-12 can also be loaded via a path 201-31 with a branch address and parity check bit from memory local register 201-16 when subcommand signal CSAFN10 is forced to a binary ONE by the circuits of block 201-32, as explained herein.

Considering the control address registers and circuits of section 201-10, it is seen that the CSA register 201-22 serves as a control store memory address register. It is a 14 bit register which stores a 13 bit address generated by the circuits of section 201 and a single parity check bit which, in accordance with the present invention, is previously generated during the assembling of the microinstructions of the microprograms subsequently loaded into control store 201-10. As shown, bit positions 0–12 store the 13 bit address and bit position 13 stores the parity check bit. Register bit positions 0–12 supply a 13 bit address via a path 201-21 for addressing any one of the 5120 word storage locations of control store 201-10. The parity check bit signal is supplied via line 201-11 to bit position 13 of register 201-12 by the output signal from bit 31 of each microinstruction word read out to the amplifier circuits of block 201-14, as explained herein in greater detail.

The 13 address and parity check bit contents of CSA register 201-12 are applied as inputs to a 14 bit position control store return address (CSR) register 201-22 via a transfer path 201-17 and to a 14 bit position control store history (CSH) register 201-18 via a transfer path 201-19. The address and parity check signals are stored in CSR register 201-11 and in CSH register 201-18 when corresponding ones of the subcommand signals CSRFA10 and CSHFA10 are forced to binary ONES by the circuits of block 201-32.

The CSR register 201-22 is used to store a return address for microprogram subroutine returns. As explained herein, this register is loaded with a return address in response to branch type and return type microinstructions. The stored address is applied to CSA register 201-12 via a path 201-37. The address and parity check signals are loaded into CSR register 201-12 when the circuits of block 201-32 force a transfer signal C CSAFR10 to a binary ONE. The CSH register 201-18 is used for displaying the previous contents of CSA register 201-12. This register is loaded automatically by control circuits and is not accessible with microinstructions.

Additionally, the 13 bit address from CSA register 201-12 is also applied as an input to a 13 bit adder circuit (CSB) 201-20 which automatically increments the address by one. For the purpose of the present invention, the adder circuit 201-20 can be considered conventional in design. The incremented address is applied to the high order 13 bit positions of CSR register 201-22 via a transfer path 201-23 and to the high order 13 bit positions of CSI register 201-25 via a transfer path 201-25. Similarly, the parity check bit signal on line 201-11 is applied via the aforementioned transfer paths to the least significant bit position of CSR register 201-22 and CSI register 201-26. The address and parity check signals are stored in CSR register 201-22 and CSI register 201-26, respectively, when corresponding ones of the subcommand signals CSRFB10 and CSIFB10 are forced to binary ONE by the circuits of block 201-32. The CSI register 201-26 is used as a second return address register and as an address/work register during control store read and write operations. The register is loaded via path 201-27 when subcommand signal CSIFN10 is forced to a binary ONE by the circuits of block 201-32.

Both the incremented address from the adder circuit 201-20 and the parity check signal on line 201-11 are applied as inputs to CSA register 201-12 via a transfer path 201-33. The address and parity check signals are stored in CSA register 201-12 when a subcommand signal CSAFB10 is forced to a binary ONE by the circuits of block 201-32.

As seen from FIG. 2, the output signals from CSI register 201-26 are applied to one input via a path 201-39 of a two input data selector multiplexer circuit 201-24. The circuit 201-24 has its other input connected to receive an address from a control panel. In response to signals DPSAA-C, the selected output signals of circuit 201-24 are, in turn, applied to CSA register 201-12 via a path 201-35. During normal operation, the CSI register 201-26 is selected as the source of address signals. The address and parity check signals are loaded into CSR register 201-12 when a transfer subcommand signal CSAFI10 is forced to a binary ONE by the circuits of block 201-32.

It will be noted that each of the microprogram accessible address registers CSA, CSR, and CSI connects to a parity check circuit (i.e., circuits 201-42, 201-43, and 201-44). Each of these circuits is always enabled and is operative to check the register associated therewith for good parity as explained herein. The output signal generated by each parity check circuit is applied as an input to error circuits, included in a block 201-45, which cause a halt in system operation upon the occurrence of an error signal indicative of a fault within control section 201.

The last components of control section 201 are a 24 bit tally counter 201-56 and an associated 24 bit increment/decrement circuit 201-58, connected as shown. The tally counter 201-56 is an up-down counter which is operated under microprogram and hardware control. A count to be loaded into the counter 201-56 and count direction can be specified by certain types of microinstructions. The counter 201-56 includes a pair of flip-flops (overflow and underflow) for indicating the detection of the occurrence of a boundary crossing relative to the last control microinstruction having been issued.

The counter 201-56 is loaded from input lines BSZ48–BSZ71 in response to a subcommand signal CSS8610. At the same time, both boundary detection flip-flops are reset to ZEROS.

The mode of operation of the increment/decrement circuit 201-58 is defined by the state of one of the flip-flops of block 201-50. When the flip-flop is a binary ONE and a binary ZERO, the circuit 201-58 is conditioned to decrement and increment, respectively, the contents of counter 201-56. When signal CSMTC10 is forced to a binary ONE in response to a microinstruction, the incremented or decremented value is loaded into counter 201-56 and the overflow and underflow flip-flops are strobed. In the increment mode, the overflow flip-flop is switched to a binary ONE only when the count switches from 77777777 to all ZEROS. Similarly, in the decrement mode, the underflow flip-flop is switched to a binary ONE only when the count switches from an all ZERO count to 77777777.

Input/Output Processing Section 210

As seen from FIG. 2, this section includes an input multiplexer circuit 210-10, a data section 210-6, an address section 210-2, an SCU memory interface section 210-4, and an S2P interface section 210-8, connected as shown. The 36 bit multiplexer (data selector) circuit 210-10 receives input signals from the data sources shown (i.e., control store 201-10, memory interface section 210-4, etc.) and applies the signals from the selected source to both section 210-2 and section 210-6. It is the states of signals P1, P2, and P3 defined by certain microinstruction fields or by the decoding of microinstructions by the circuits of block 201-40 or by other circuits as explained herein which designate the source to be selected. In a similar fashion, the states of the groups of signals P5, D6, MG2, and D5, D6, MG3 generated in response to certain microinstruction fields and the circuits of block 201-34 designate section 210-2 and section 210-10, respectively, as the receiver of the set of signals from multiplexer circuit 210-10.

Figure 5B:
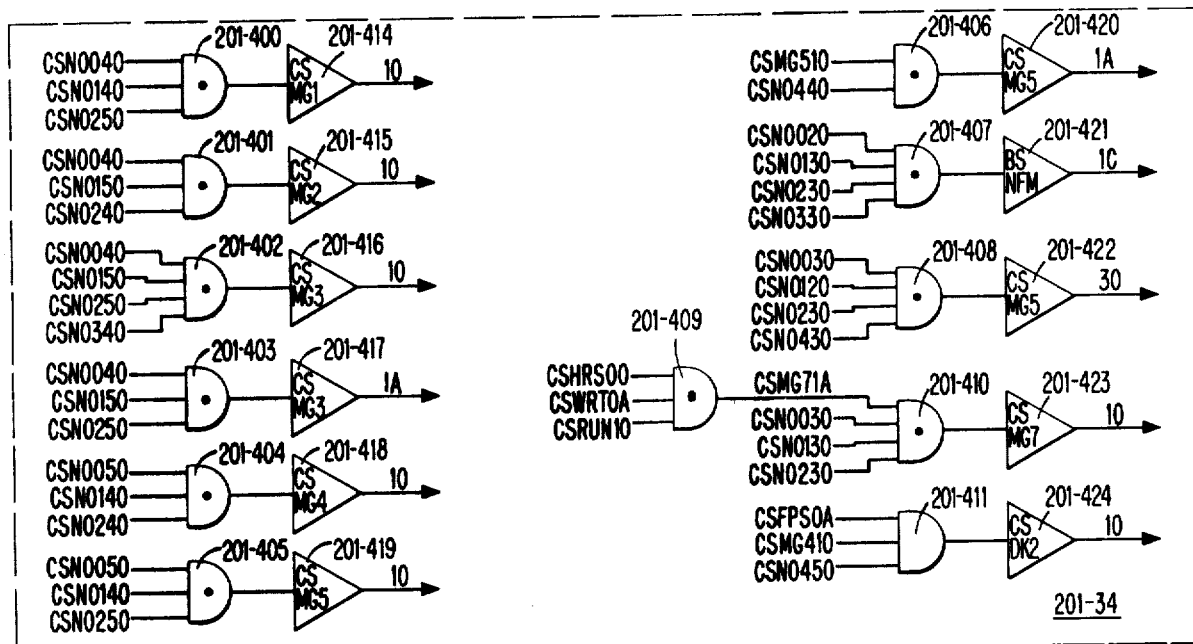
Figure 5E:
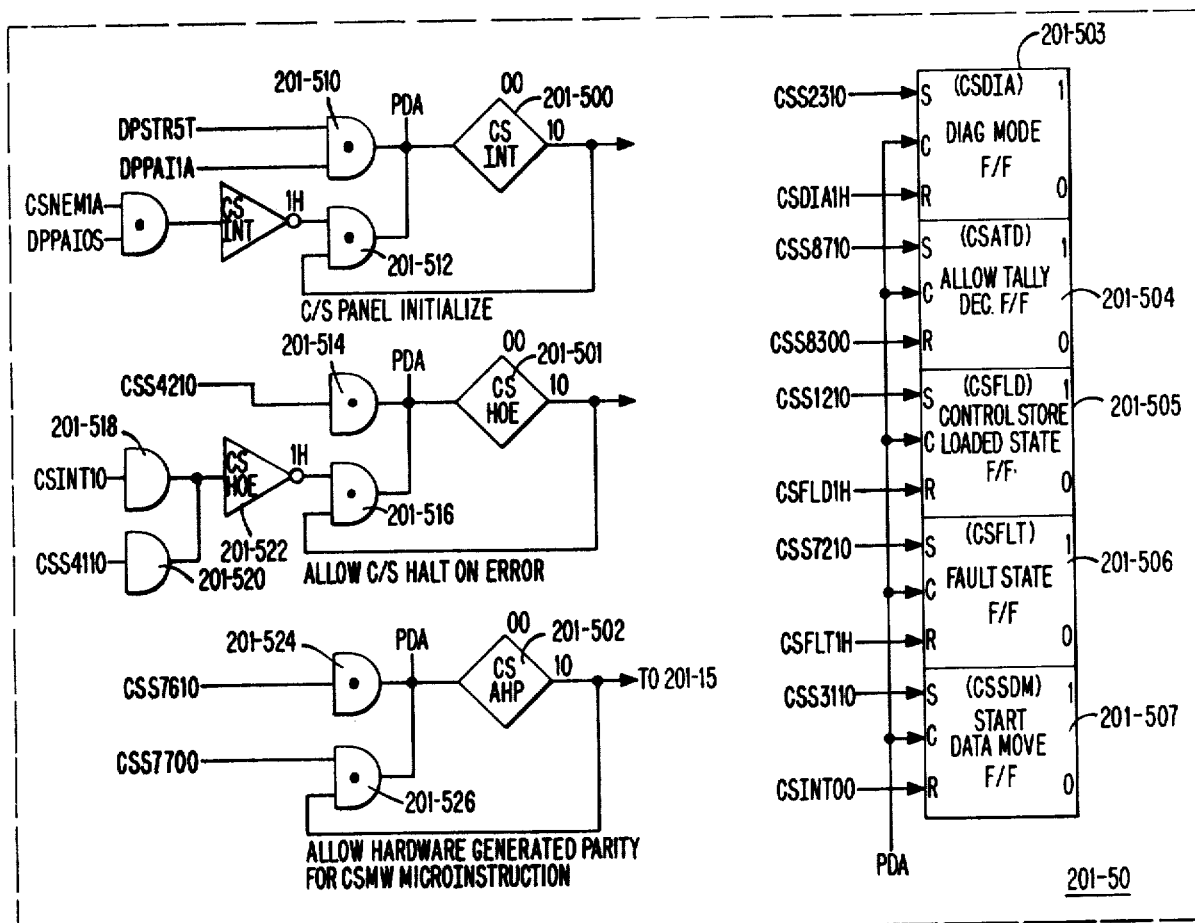
Figure 5C:
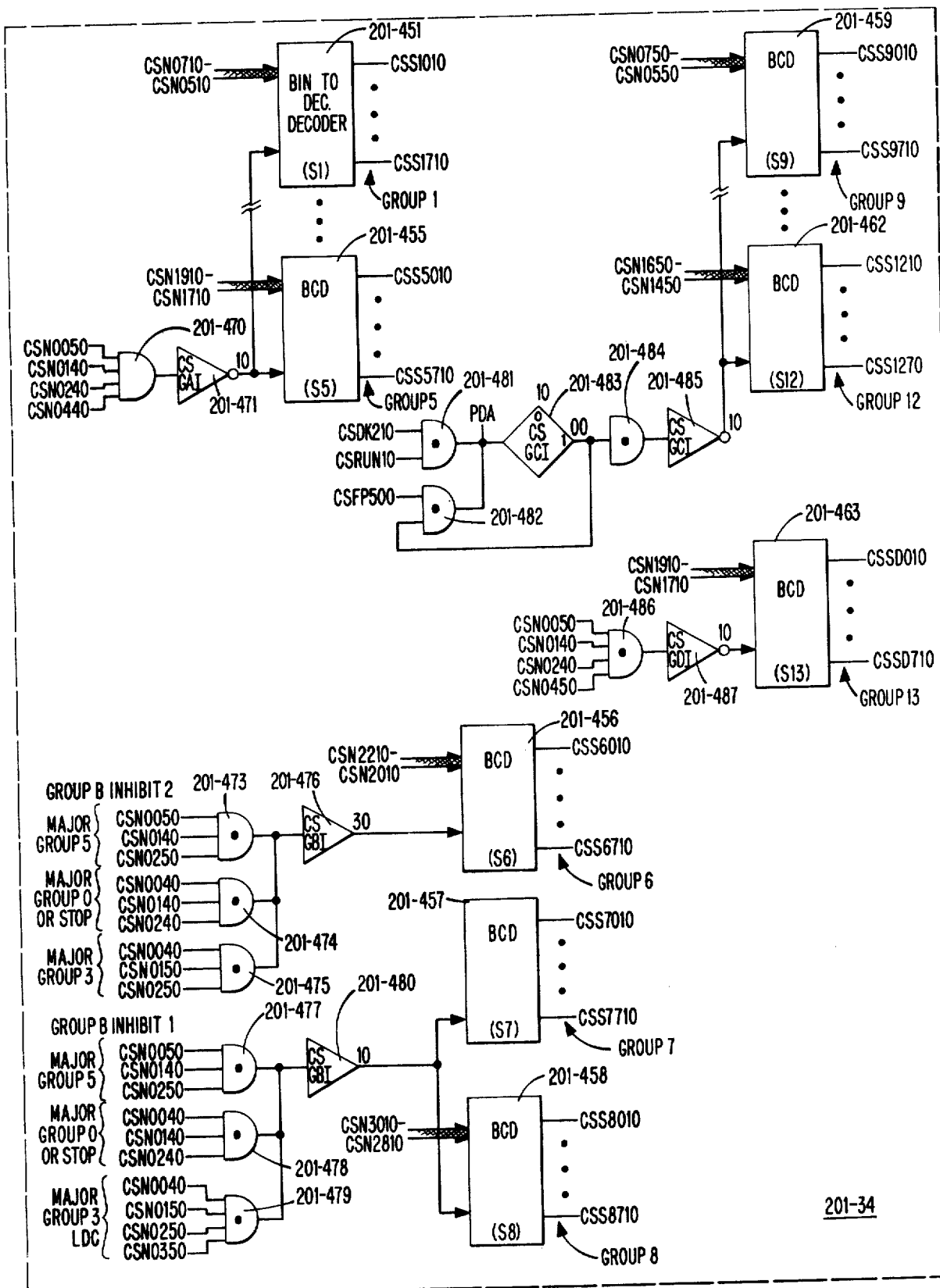
Figure 5D:
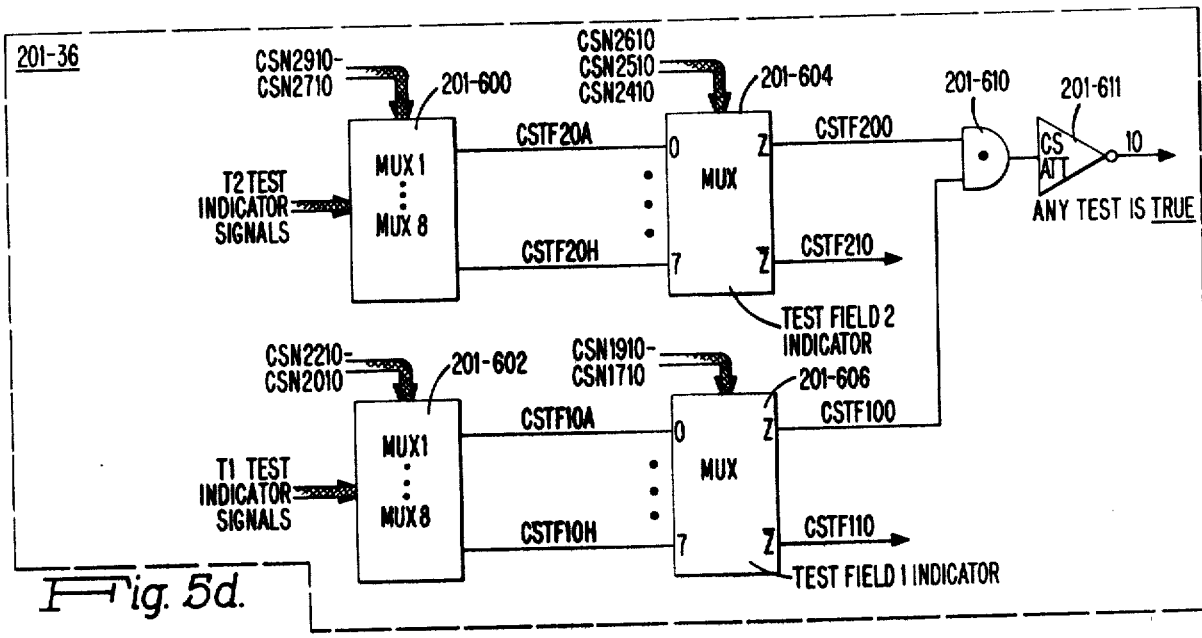
Figure 5H:
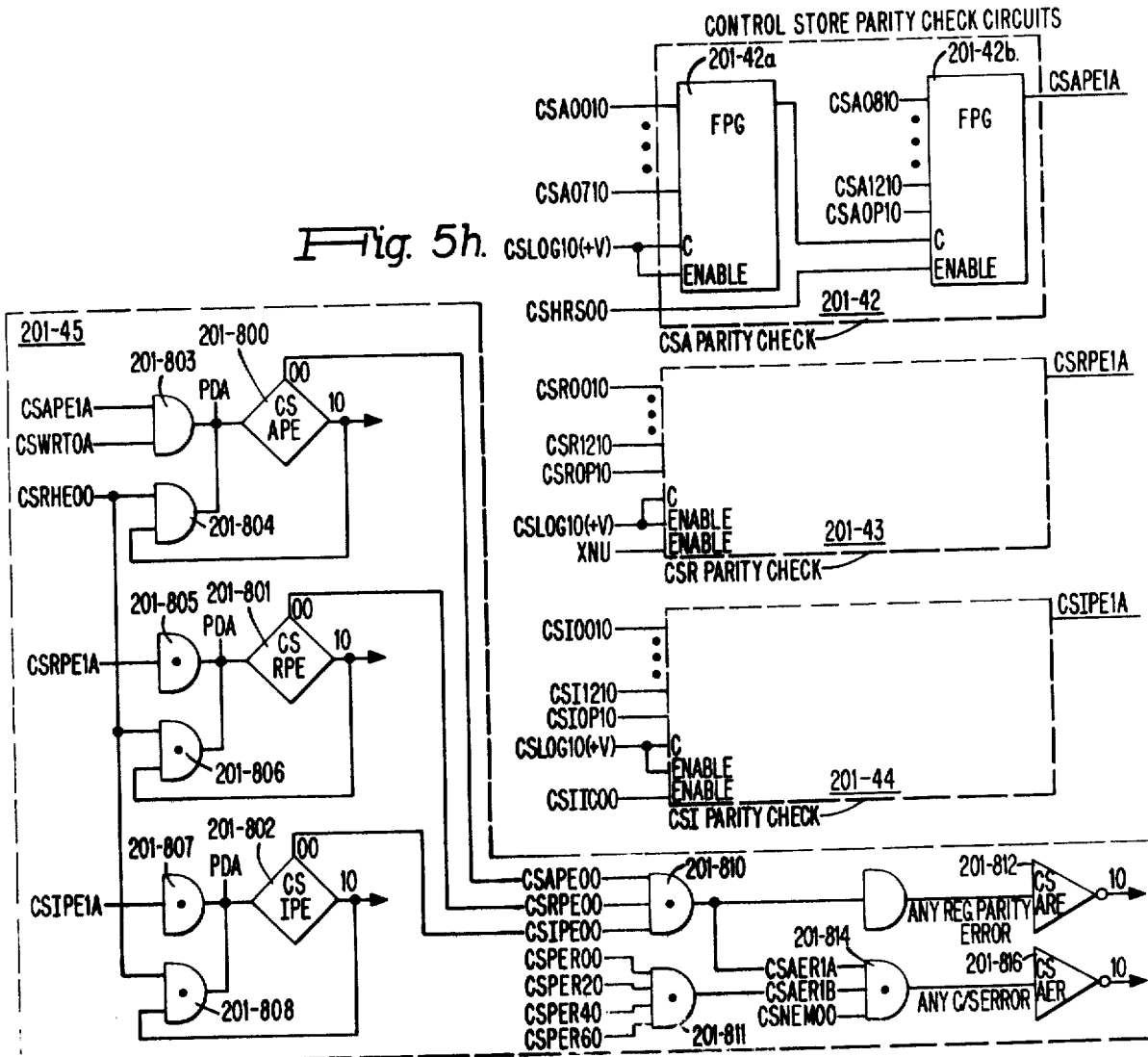
Figure 5F:
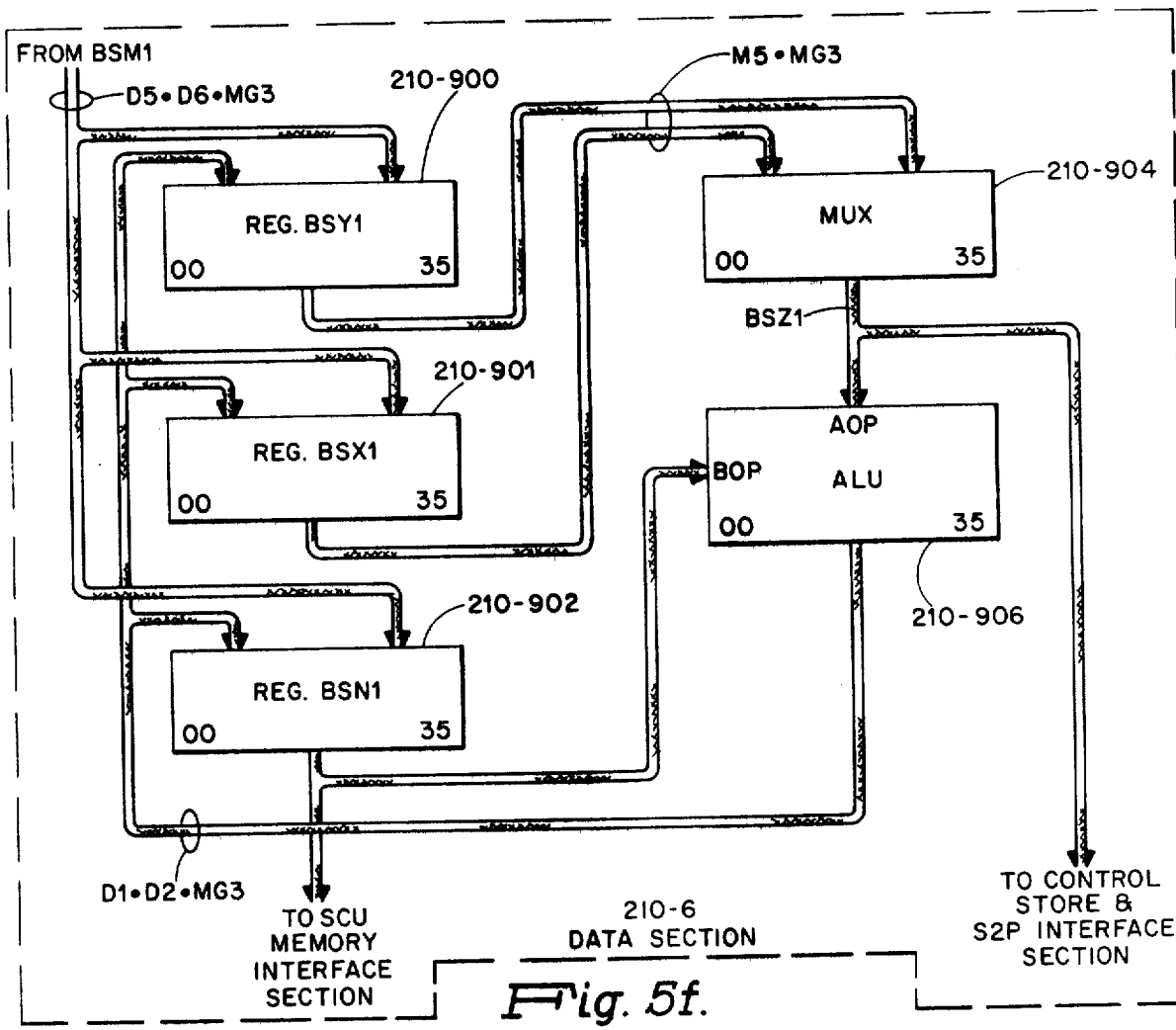

The data section 210-6, shown in greater detail in FIG. 5f, provides the adapter 200 and S2P processor 300 with a communication path to the SCU 110. The section 210-6 performs the necessary data manipulation operations for transferring data bytes and ensuring proper data byte alignment. Data transfers within the adapter 200 can be controlled by microprogram or by hardware sequences. Unless a microprogram releases control to a group of hardware control circuits which can be considered as part of block 210-6, the manipulation of registers and multiplexer circuits proceeds under direct control of the microprogram. When certain microinstructions are executed such as for starting a data transfer operation for releasing control, the hardware control circuits control the transfer until it is completed.

Form this it can be seen that the subcommand signals (i.e., P1, P2, P3 or D5, D6, MG3, etc.) which cause the transfer of data signals are generated by logic gate circuits having at least two sets of inputs. One set includes a signal indicating that the hardware control circuits are to control the transfer, signals from a cycle counter included as part of the hardware control circuits and signals representative of system conditions. The other set includes the complement of the signal indicating that the transfer is to proceed under microprogram control, a signal designating a particular type of microinstruction and signals corresponding to a bit or bits within the particular microinstruction. For an example of the type of circuits which could be used to generate such hardware sequences, reference may be made to U.S. Pat. No. 3,909,799, which is assigned to the same assignee as named herein.

The address control section 210-2 performs operations for addressing main memory 150 during read and write operations. The section also performs the required address checking operations related to memory protection and base relocation operations. As explained herein, this section is organized in a fashion similar to data section 210-6.

The memory interface section 210-4 includes registers and circuits for connecting the adapter 200 to the lines which comprise the system port interface of the SCU 110. These lines include up to 74 bidirectional data and parity lines, 24 address lines, five command lines, and a number of control lines including lines for transmitting initialize, transmit, interrupt, ready, and connect signals between the adapter 200 and SCU 110.

The S2P interface section also includes registers and circuits for connecting the adapter 200 to the memory interface lines of the processor 300. These lines include two sets of 19 memory address lines, 36 data lines (18 in and 18 out) and a number of control lines (to perform S2P clock stalls, S2P relocation, write masking).

The section 210-8 includes data selection circuits for aligning and transferring characters at a rate compatible with the memory interface requirements of processor 300. More specifically, in the preferred embodiment, the S2P processor 300 is a two character processor which, during normal operation, extracts two data characters from its main memory during a 1 microsecond cycle of operation. The two data/address buses provide an interface with two asynchronous one byte wide registers connected to a "crossbar" bus switching network. The arrangement enables the processor 300 to manipulate two characters at a time (reading or writing) in a manner which is identical to its normal operating environment.

MICROINSTRUCTION FORMATS

Before describing in greater detail the different blocks of FIG. 2, the different types of microinstructions and their formats will be described with reference to FIG. 3.

Referring to FIG. 3, it will be noted that the adapter 200 is capable of executing the operations specified by the op codes of up to 25 different microinstructions which are organized into eight major groups. Each microinstruction word contains all the operands required for a given operation.

The eight major groups and the types of operations designated are:

Group 0: no-op—no operation
Group 1: MMRQ—main memory (SCU) request parameter and control operation
Group 2: ARCA—address register arithmetic and control operation
ARCL—address register logic and control operation
Group 3: DRCA—data register arithmetic and control operation
DRCL—data register logic and control operation
LDC—load constant to BSN1 register operation
Group 4: DCK1—direct control 1 operation
DCK2—direct control 2 operation
Group 5: CBOTN—conditional branch on test and no execute operation
CBOTE—conditional branch on test and execute operation
CBRTN—conditional branch on test and load return register and no execute operation
CBRTE—conditional branch on test and load return register and execute operation
Group 6: LCSIK—load control store interrupt register and control operation
Group 7: UCBK—unconditional branch and control operation
UBRK—unconditional branch and control and load return register operation
RTNFI—return from interrupt register and control operation
RTFIR—return from interrupt register and control and load return register
RTNFR—return from return register and control operation
RTFRR—return from return register and control and load return register operation
CSMR—control store memory read operation
CSWR—control store memory write operation From FIG. 3, it is seen that each microinstruction includes a five bit op code (i.e., bits 0–4) for specifying the type of operation to be performed. Additionally, each microinstruction has 26 bits (bits 5–30) coded to specify subcommands, constants, addresses, etc., and five parity check bits (i.e., bits 31–35). Each of parity bits 32–35 is associated with a different byte of the microinstruction word. That is, bit 32 represents odd parity for bits 0–7, bit 33 represents odd parity for bits 8–15, bit 34 represents odd parity for bits 16–23, and bit 35 represents odd parity for bits 24–30. Bit 31 is a special parity check bit which represents odd parity for the next sequential absolute memory address to be accessed. As explained herein, the value for bit 31 is established during the assembling of the microinstructions prior to their being stored in control store 201-10.

The different microinstructions of FIG. 3 will now be discussed in greater detail. The single group 0 microinstruction has an all ZERO op code which specifies no operation. The single group 1 microinstruction has an op code of 00100 and this microinstruction sets up parameters for main memory (SCU) cycles. Bits 5–9 are coded to specify the type memory command, bits 10–13 are coded to specify a zone. Bits 17, 18, and 19 are coded to specify relocation, paging, and limiting check modes, respectively. Bits 20–22, 25–27, and 28–30 are coded to specify subcommand groups 6, 7, and 8, respectively.

The first group 2 microinstruction, ARCA, has a 01000 op code. This microinstruction conditions the address control section 210-2 to perform arithmetic operations on the addresses stored in section registers required for main memory (SCU) addressing. Bits 5–10 are coded to define the type of arithmetic operation (mode) to be performed by an arithmetic and logic unit (ALU) included in section 210-2 (bit 10 is a Carry In bit). Bits 15–17 are coded to select the desired port (source) on multiplexer circuit 210-10. The pairs of bits 11–12 and 18–19 are coded to specify which register in the first and second groups of registers is to receive the ALU result output signals. The bit pair 23–24 is coded to specify which register of the first group is to receive the output signals from multiplexer circuit 210-10. Bits 20–22, 25–27, and 28–30 are coded to specify subcommand groups 6, 7, and 8, respectively.

The second group 2 microinstruction, ARCL, has a 01001 op code. This microinstruction is coded the same as the ARCA microinstruction with the exception that bits 5-10 are coded to define the type of logical operation to be performed by the section's ALU. Since it is a logical operation, there is no Carry In signal and bit 10 is a ZERO.

The first and second group 3 microinstructions are coded similar to the microinstructions of group 2. The first group 3 microinstruction, DRCA, has a 01100 op code. This microinstruction conditions the data section 210-6 for performing arithmetic operations upon the data contents of the different registers included in the section. As explained herein, operations can be performed separately or simultaneously upon the upper 36 bits (00-35) or lower 36 bits (36-71) of each register. Bits 5-10 define the type of arithmetic operation which is to be performed by the arithmetic and logic units (ALU's) of the section. Bits 15-17 are coded to select the port (source) of bits 0-35 from multiplexer circuit 210-10 and bits 20-22 similarly select the port (source) of bits 36-71 from a second multiplexer circuit, not shown. The pairs of bits 11-12 and 13-14 are coded to define which one of the registers within the first and second groups of registers is to receive result output signals from the section's ALU's. The pairs of bits 18-19 and 23-24 are coded to define which one of the registers within the first and second groups of registers is to receive output signals from the multiplexer circuit 210-10 and the second multiplexer, not shown. Again, bits 25-27 and 28-30, respectively, are coded to specify group 7 and 8 subcommands.

The second group 3 microinstruction, DRCL, has a 01101 op code. This microinstruction is coded the same as the DRCA microinstruction with the exception of mode bits 5-10 which are coded to define the type of logical operation to be performed by the section's ALU's.

The last group 3 microinstruction has a 01110 op code. This microinstruction causes a 26 bit constant (bits 5-30) to be delivered to a specific register (BSN1) within section 210-6 via the multiplexer circuit 210-10.

The first and second group 4 microinstructions DCK1 and DCK2 have op codes of 10000 and 10001, respectively. The first group 4 microinstruction has groups of bits coded to specify operations defined by subcommand groups 1-8. The DCK2 microinstruction has groups of bits coded to specify operations defined by subcommand groups 6-13 as indicated.

The group 5 microinstructions are conditional branch microinstructions used to examine the states of various test indicator circuits within the adapter 200 and branch to a location within the control store 201-10 specified by address bits 5-16 when the results of the test are true according to a specified convention. The bits 17-22 and 24-29, respectively, are coded to specify the two test indicator circuits whose states are to be examined. It will be noted that the low order branch address bit (A12) is not specified in the microinstruction. Bit 23 is an odd parity bit calculated for address bits 5-16 during the assembling of the microinstructions before being stored in control store 201-10. The bit A12 is assumed to be ZERO for the calculation.

In the branching convention employed, a control store microprogram branches to the branch address location when the state of the indicator specified by test field 1 is not true and the state of the indicator specified by test field 2 is true. Bit 12 of the CSA register 201-12 is set to a binary ZERO. When the indicator state specified by test field 1 is true and the indicator state specified by test field 2 is true or false, the microprogram branches to the branch address location plus one (bit 12 of the CSA is set to a binary ONE). Since bit 23 is an odd parity bit for the branch address when the test field 1 result is true, effective to increment the branch address by one, the state of this bit is complemented or inverted before being stored in CSA register 201-12. This preserves good parity as explained herein.

The type of operations performed by each of the branch type microinstructions will now be discussed. During the execution of each branch microinstruction, if either condition being tested by test fields 1 and 2 is true, the control store microprogram branches to the microinstruction specified by the branch address. The different microinstructions provide for the following variations in operations.

The CBOTN microinstruction has an op code of 10100. When executed, it inhibits the execution of the next microinstruction in sequence when the branch condition tested is true. When the condition being tested is not true, the microprogram sequences to the next microinstruction.

The CBOTE microinstruction has an op code of 10101. This microinstruction is executed in the same manner as the CBOTN microinstruction except that the microinstruction immediately following is always executed prior to branching.

The CBRTN microinstruction has an op code of 10110. This microinstruction is also executed in the same manner as the CBOTN microinstruction with the exception that it causes the CSR register 201-22 to be loaded with the address of the location immediately following the branch microinstruction.

The CBRTE microinstruction has an op code of 10111. This microinstruction is executed in the same manner as the CBOTE microinstruction except that it causes the CSR register 201-22 to be loaded with the address of the branch microinstruction plus two (this accounts for the microinstruction executed following the branch).

The single group 6 microinstruction, LCSIK, has a 11010 op code. This microinstruction contains a 13 bit address and an odd parity check bit corresponding to bits 5-17 and bit 23, respectively, which is loaded into CSI register 201-26. Bits 20-22, 25-27, and 28-30, respectively, are coded to specify subcommand groups 6, 7, and 8.

The group 7 microinstructions perform a modification of the CSA register 201-10 contents prior to execution. As seen from FIG. 3, each such microinstruction includes a 13 bit field (i.e., bits 5-17) coded to specify a branch address or all ZEROS. Bit 23 is coded to specify odd parity for the microinstructions containing branch addresses. In certain cases, bits 18-19 and 23-24 are also coded to further define the type of microinstruction. Bits 20-22, 25-27, and 28-30, respectively, are coded to specify subcommand groups 6, 7, and 8.

Considering each microinstruction separately, it is seen that the UCBK microinstruction has a 11100 op code. This microinstruction causes the control store microprogram to branch to the location specified by address bits 5-17. The UBRK microinstruction having a 11110 op code is executed in the same manner as the UCBK microinstruction except that it also causes the CSR register 201-22 to be loaded with a return address from CSB incrementing circuit 201-20.

The RTNFI microinstruction has an op code of 11100. This microinstruction causes the control store microprogram to return to the program address specified by the contents of the CSI register 201-26. The RTFIR microinstruction has an op code of 11110 and is executed in the same manner as the RTNFI microinstruction except that it also causes the CSR register to be loaded with a return address obtained from CSB incrementing circuit 201-20.

The RTNFR microinstruction has a 11100 op code. This microinstruction causes the control store microprogram to return to the program address specified by the CSR register 201-22. The RTFRR microinstruction with an op code of 11110 is executed in the same manner as the RTNFR microinstruction except that it also causes the CSR register 201-22 to be loaded with a return address obtained from CSB incrementing circuit 201-20.

The CSMR microinstruction has a 11101 op code. This microinstruction causes the contents of the storage location specified by the contents of the CSI register 201-26 to be read from the control store 201-10 and loaded into a predetermined one of the registers of data section 210-6. The CSMW microinstruction with the same op code causes the contents in a predetermined one of the registers of data section 210-6 to be written into the storage location specified by the contents of CSI register 201-26.

DETAILED DESCRIPTION OF FIG. 2 CIRCUITS

The different ones of the blocks of FIG. 2 will now be discussed with reference to FIGS. 5a through 5i.

Basic Control Decode Circuits 201-32

FIG. 5a shows the circuits 201-200 through 201-272 which generate the different register transfer signals for conditioning the various registers of control section 201 for transfers during microinstruction execution.

Referring to the figure, it is seen that a plurality of AND gates 201-200 through 201-202, together with an inverter circuit 201-203 and amplifier circuit 201-204, are operative to generate the early transfer signal CSANE10 in response to certain group 7 microinstructions (i.e., UCBK and UBRK microinstructions). The signal CSIFN1A is forced to a binary ZERO by either a CBOTN or CBRTN microinstruction where the condition specified by test field 1 or test field 2 is true. This inhibits the generation of signal CSANE10 as well as early transfer signal CSIFN10 by an AND gate 201-253.

The AND gates 201-206 and 201-207 cause amplifier circuit 201-208 to force transfer signal CSRFB10 to a binary ONE in response to certain group 5 and group 7 microinstructions. These are the CBRTE microinstruction of group 5 and the UBRK, RTFIR, and RTERR microinstructions of group 7.

The AND gate 201-210 causes the amplifier circuit 201-211 to force transfer signal CSRFA10 in response to a CBRTN microinstruction of group 5. The gates 201-212 and 201-213 cause the amplifier circuit 201-214 to force transfer signal CSAFR10 to a binary ONE in response to certain conditions (i.e., the end of the scan operation, CSASCOT = 0, in response to an initialize signal, or a "top of memory" signal during a prescan operation, CSAFRIB = 0) and in response to certain group 7 microinstructions (i.e., RTNFR and RTFRR microinstructions). The gates 201-230 and 201-231 and inverter circuits 201-232 through 201-234 provide the appropriate conditioning signal to gate 201-212, as shown.

The gate 201-216 causes the amplifier circuit 201-218 to force transfer signal CSIFB10 to a binary ONE during a "hardware register swap" operation (i.e., CSHRS10 = 1) in which the CSI register 201-26 is loaded with an incremented address from CSB incrementing circuit 201-20 during the CSMR and CSWR microinstructions. AND gate 201-217 causes the circuit 201-218 to force the CSIFB10 signal to a binary ONE during the fetching phase of CSMR and CSMW microinstructions.

The AND gate 201-220 inhibits the inverter circuit 201-222 from forcing the transfer signal CSHFA10 required for updating history register 201-18 during the execution of CBOTN and CBRTN branch microinstructions when any one of conditions being tested is true (CSATT10 = 1). The gate 201-221 also inhibits signal CSHFA10 from being forced to a binary ONE when the control section 201 is not in the RUN state (i.e., CSRUN00 = 1). The conditions which set the control section to the RUN state are the pressing of a control panel one-instruct button, the panel run button, or the completion of a successful scan operation. The control section switches from the RUN state to a halt state upon the depression of a panel initialize button, the one instruct button or panel stop button in addition to certain error conditions, etc.

The AND gates 201-224, 201-226, and 201-227 inhibit inverter circuit 201-228 from forcing transfer signal CSAFB10 to a binary ONE in the case of certain types of microinstructions. For example, the AND gates 201-224 and 201-226 inhibit CSAFB10 from being switched to a binary ONE during the execution of group 5 branch microinstructions when either condition tested by test field 1 or test field 2 is true. This prevents the normal (nonbranch) incrementing of the address contents of CSA register 201-12 from the CSB incrementing circuit 201-20. The AND gate 201-241 and gate 201-240 also inhibit CSAFB10 from being switched to a binary ONE during CSMR and CSMW microinstructions. The AND gate 201-237 also inhibits CSAFB10 when the control section 201 is not in the RUN state (i.e., CSRUN00 = 1) and it has not been initialized, is not in the scan mode (CSINT00 = 1, CSASC00 = 1), or signal CSAFR10 is a binary ONE. A last AND gate 201-236 inhibits CSAFB10 from switching to a binary ONE during the fetching phase of group 7 microinstructions.

The gate 201-245 causes amplifier circuit 201-247 to force transfer signal CSAFI10 to a binary ONE at the completion of a CSMR or CSMW microinstruction or at the completion of a panel write operation via the gates 201-265 through 201-268 which switch flip-flop 201-270 to a binary ONE for one clock pulse interval (reset via AND gate 201-269). In response to RTNFI and RTFIR microinstructions of group 7, the AND gate 201-246 also forces the CSAFI10 signal to a binary ONE.

The pair of AND gates 201-248 and 201-249 cause amplifier circuit 201-250 to force the late transfer signal CSAFN10 to a binary ONE during the execution of group 5 conditional branch microinstructions when the result of either condition being tested by test field 1 or test field 2 is true.

The AND gates 201-252 and 201-253 cause amplifier circuit 201-254 to force the early transfer CSIFN10 signal to a binary ONE during the fetching phase of an LCSIK group 6 microinstruction when signal CSIFN1A is a binary ONE under the conditions discussed above.

The gates 201-256 and 201-257 inhibit the op code transfer signal CSNFM90 from being forced to a binary ONE during the execution of CSMR and CSMW microinstructions of group 7. The gate 201-258 inhibits the CSNFM90 signal during the execution of CBOTN and CBRTN microinstructions of group 5 when the condition being tested by test field 1 or test field 2 is true. In a fashion, AND gate 201-262 causes amplifier circuit 201-263 to force transfer signal CSNFM00 to a binary ZERO in response to CBOTN and CBRTN microinstructions when the condition being tested is true.

Major Group and Subcommand Decode Circuits 201-34

The circuits which generate the various group decode signals applied to the circuits of block 201-32 are shown in detail in FIG. 5b. Referring to the figure, it is seen that the major group signals result primarily from decoding different combinations of the op code bits 0–4. The circuits include a plurality of AND gates 201-400 through 201-411 which are operative to condition their respective amplifier circuits 201-414 through 201-424 in response to different op code bit patterns of the different microinstruction types.

FIG. 5c shows the subcommand decoder circuits which are operative to generate the subcommand signals required for microinstruction execution. As seen from the figure, the subcommands are divided into 13 separate groups of seven subcommands. Thus, block 201-34 includes 13 binary to decimal (BCD) decoder circuits 201-451 through 201-463, each of which decodes a specific group of bits from the memory local register 201-16. The high order bit input of each decoder circuit is used as an enable input and receives inhibit signals (i.e., CSGAI10 through CSGDI10) generated by different ones of the circuits 201-470 through 201-487. This means that when an inhibit signal is forced to a binary ONE, this inhibits the decoding of subcommand signals because the input codes now have values higher than those required for generating the seven subcommands.

The inhibit signals labeled groups A through D are specified as follows:

1. CSGAI10 = (group A) for subcommand decoder groups 1–5. It is forced to a binary ZERO only in response to DCK1 microinstructions.
2. CSGBI10 = (group B) for subcommand decoder groups 7–8. It is forced to a binary ZERO in response to all microinstruction groups except group 0, group 5, or LDC microinstructions.
3. CSGBI30 = (group B) for subcommand decoder group 6. It is forced to a binary ZERO in response to all microinstruction groups except groups 0, 3, and 5.
4. CSGCI10 = (group C) for subcommand decoder groups 9–12. It is forced to a binary ZERO only in response to DCK2 microinstructions.
5. CSGDI10 = (group D) for subcommand decoder group 13. It is forced to a binary ZERO only in response to DCK2 microinstructions.

Test Indicator and Branch Circuits 201-36

FIG. 5d shows the circuits for decoding the two six bit groups of test field bits included within group 5 microinstructions. As seen from the figure, the circuits include four groups of multiplexer circuits. Two of the groups corresponding to blocks 201-600 and 201-602 each includ eight multiplexer circuits. The other two groups corresponding to blocks 201-604 and 201-606 each include a single multiplexer circuit. Each multiplexer selector circuit has eight inputs, each of which is connected to receive a predetermined indicator signal representative of a particular condition.

The particular condition to be selected by each multiplexer circuit of blocks 201-600 and 201-602 is designated by test field 1 bits CSN20-22 and test field 2 bits CSN27-29. The remaining three bits of each test field are used to select one of the eight outputs from each group of eight multiplexer circuits (i.e., signals CSTF10A-CSTF10H and CSTF20A-CSTF20H), as shown. An AND gate and inverter circuit combine the test field 1 and test field 2 indicator output signals and forces signal CSATT10 to a binary ONE when the condition tested by test field 1 or test field 2 is true.

Major State Circuits 201-50

The major state circuits include a plurality of flip-flops 201-500 through 201-507, a number of which are shown in FIG. 5e. For the purpose of simplicity, only three of the flip-flops are shown with the circuits associated therewith. However, the other flip-flops include similar circuit arrangements.

The flip-flop 201-500 indicates when the control section 201 has been initialized. The AND gate 201-510 switches flip-flop 201-500 to a binary ONE when a control store initialize button is depressed. The AND gate 201-512 resets the flip-flop upon the release of the button and when signal CSNEM1A goes high. THe CSINT10 signal is used to reset the CSR and CSI registers 201-22 and 201-26, as explained herein and places the adapter 200 and S2P processor in a known state.

The flip-flop 201-501 allows the control section 201 to halt operation upon the detection of a "hardware" error, a control store memory parity error, a register parity error (i.e., the CSA, CSI, and CSR registers), or a non-existent memory check error. The gate 201-514 switches the flip-flop to a binary ONE in response to subcommand signal CSS4210. The flip-flop resets in response to depression of the initialize button or in response to subcommand signal CSS4110. When reset, the flip-flop 201-501 does not cause a halt in system operation in response to control store errors. The errors just cause the setting of appropriate status indicators. It will be appreciated that the mode of operation enabled by flip-flop 201-501 finds advantage when the system is conditioned to execute basic logic test and maintenance verification routines for testing checking circuit operation.

The next flip-flop 201-502 allows selection of either unmodified 36 bits for writing into the control store 201-10 (i.e., when signal CSAHP10 = 0) or parity check bits generated by circuits of block 201-15 for writing into the control store 201-10 (i.e., when signal CSAHP10 = 1). The flip-flop 201-502 is switched to a binary ONE subcommand signal CSS7610 via gate 201-524. It is reset by subcommand signal CSS7700 via AND gate 201-526.

The flip-flop 201-503 is a diagnostic mode used during the execution of maintenance verification routines as a status indicator. It is switched to a binary ONE by subcommand signal CSS2310 and reset to a binary ZERO by hold signal CSDIA1H. The flip-flop 201-504 defines the mode of the CST tally counter 201-54. When set to a binary ONE by subcommand signal CSS8710, the flip-flop indicates that the counter is in a "down-count" mode. When reset to a binary ZERO by subcommand signal CSS8300, the flip-flop indicates that the counter is in an "up-count" mode.

The flip-flop 201-506 is a status flip-flop which, when set to a binary ONE, indicates that the control store 201-10 has been loaded with "personality firmware". It is switched to a binary ONE in response to subcommand signal CSS1210 and is reset to a ZERO by hold signal CSFLD1H which is forced to a ZERO when the control store panel initialize button is depressed.

The last flip-flop 201-507 is a start data move flip-flop which activates the circuits included in the data section 210-20 to move data through the adapter 200. It is switched to a binary ONE in response to subcommand signal CSS3110. The flip-flop is reset to a binary ZERO by forcing signal CSINT00 to a binary ZERO. The signal CSINT00 is forced low by the data section circuits, an S2P initialize signal or by subcommand signals.

Data Control Decode Circuits 201-40

For the most part, these circuits are similar to the circuits of FIGS. 5a through 5c. FIG. 5g shows in greater detail the circuits which condition data section 210-6 and multiplexer circuit 210-10 during the execution of CSMR and LDC microinstructions. Referring to the figure, it is seen that the control signal BSNFM10 is generated when a flip-flop 201-700 is switched to a binary ONE via an AND gate 201-702 or an AND gate 201-704 in response to either an LDC group 3 microinstruction and CSMR group 7 microinstruction, respectively. The AND gate 201-706 resets the flip-flop to a binary ONE state upon the occurrence of the next clock pulse.

S2P Control Panel Logic Circuits 201-55

Figure 5I:
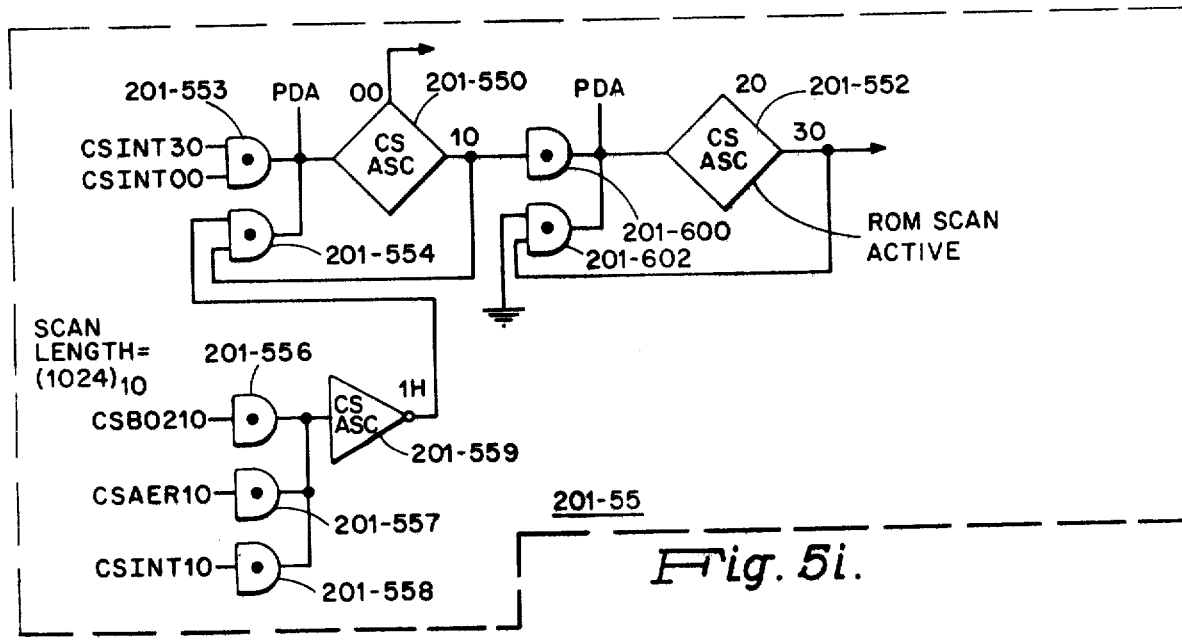

FIG. 5i shows circuits which performed a pre-scan of the control store 201-10. These circuits are included as part of block 201-55 for ease of explanation. Referring to the figure, it is seen that the circuits include a pair of series connected flip-flops 201-550 and 201-552. The first flip-flop is switched to a binary ONE whenever the control store initialize button is released and remains set until the scan is successfully completed (i.e., signal CSB0210 = 1), or a control store error is detected (i.e., signal CSAER10 = 1).

The second flip-flop 201-552 switches to a binary ONE via gate 201-600 one clock pulse following the switching of flip-flop 201-550 to a binary ONE. (That is the signals CSASC00; and CSASC30; CSAER00 are used to generate signal CSASCOT, end of ROM scan, which causes the control section 201 to enter the RUN mode at the completion of a successful scan.)

Read/Write and Parity Generation Circuits 201-15

The circuits generate certain control signals required for the execution of a control store write operation. Referring to FIG. 5g, it is seen that the circuits include a pair of series connected flip-flops 201-150 and 201-151. The binary ONES outputs of the flip-flops are combined in an AND gate 201-159 to cause an amplifier circuit 201-160 to produce the write control pulse CSWRT10.

The flip-flop 201-151 is switched to a binary ONE in response to signal DPCSE10 generated by the depression of a control panel button and applied via gate 201-157. The AND gate 201-158 switches the flip-flop 201-151 to a binary ONE in response to a CSMW microinstruction. An AND gate 201-155 resets the flip-flop to a binary ZERO upon the occurrence of a next clock pulse.

Several of the circuits which are conditioned by signals produced from flip-flop 201-151 include a pair of flip-flops 201-161 and 201-162. The flip-flop 201-161 is switched to a binary ONE by write signal CSWRT1A via an AND gate 201-163. An AND gate 201-164 also switches the flip-flop to a binary ONE in response to a CSMR group 7 microinstruction. Upon the occurrence of a subsequent clock pulse, an AND gate 201-165 resets the flip-flop to a binary ZERO state.

The binary ONE signal from flip-flop 201-161 when applied via gate 201-166 causes flip-flop 201-162 to switch to a binary ONE. The ONE signal from this flip-flop is used to inhibit the parity check circuit 201-44 from performing a check on the address contents of CSI register 201-26 after the execution of CSMR and CSMW microinstructions or after a control panel initiated write operation. The flip-flop 201-162 is reset via an AND gate 201-167 in response to an LCSIK group 6 microinstruction (i.e., CSIFN10 = 1), a control store initialize signal (i.e., CSINT10 = 1), or a subcommand signal (i.e., CSS7310 = 1). Thus, flip-flop 201-162 inhibits parity checking of CSI register 201-26 after a control store read or write cycle of operation until the CSI register 201-26 is again loaded with good parity via an LCSIK microinstruction, an initialize signal or firmware subcommand.

FIG. 5g also includes the parity generator circuits which generate new parity bits for a word written into control store 201-10 during the execution of a CSMW microinstruction. The parity circuits are conventional in design.

As seen from the figure, each of four parity generator circuits generates an odd parity check bit for the bits of a different one of four bytes which make up the word. The odd check bit (i.e., signals BSZP110 through BSZP410) from each circuit is applied to a different one of a first group of AND gates 201-174 through 201-176. The original unmodified bits (i.e., signals BSZ3210 through BSZ3510) are applied to different ones of a second group of AND gates 201-175 through 201-177, as shown.

The circuits 201-180 through 201-184 provide for either the selection of the parity bits generated by the circuits 201-170 through 201-173 (i.e., when signal CSAHP10 = 1) or the unmodified BSZ bits (signal CSAHP10 = 0). As mentioned previously, the first mode of operation constitutes a normal mode of operation which enables data to be written into scratch pad locations of control store 201-10, as explained herein. The second mode of operation, as mentioned, is used during the execution of load control store and basic logic test routines. The signals CSAUP10 and CSAGP10 are a binary ZERO and a binary ONE, respectively, when the control store 201-10 is placed in a stop mode. This allows the generation of new parity check bits in response to control panel initiated write operations notwithstanding the state of signal CSAHP10.

Parity Check Circuits and Error Circuits 201-42 through 201-45

FIG. 5h shows the parity check circuits of blocks 201-42, 201-43, and 201-44, together with associated flip-flops and gating circuits of block 201-45. Only one of the parity check circuits is shown in detail. Each parity check circuit includes two series connected parity generator circuits (i.e., circuit 201-428 and 201-426), which are conventional in design.

The first circuit performs an exclusive or of the high order eight bits of its associated register while the second circuit performs an exclusive or of the low order eight bits of the same register to which it adds a carry provided by the first circuit.

When the number of ONE bits is even, the second circuit forces its output terminal to a binary ONE (i.e., signal CSAPE1A = 1) to signal an error condition.

It will be noted that some of the parity circuits receive more than one enable signal (i.e., CSHRS00, CSLOG10, CSIIC00). Normally, these signals are binary ONES which in turn enable the parity check circuits during system operation.

Each of the parity error signals CSAPE1A, CSRPE1A, and CSIPE1A is applied as an input to a corresponding one of the flip-flops 201-800 through 201-802. The flip-flop 201-800 is switched to a binary ONE by an AND gate 201-803 when signal CSWRTOA is a binary ONE (not a control panel or CSMW microinstruction write operation). The flip-flops 201-801 and 201-802 are switched to binary ONES in response to signals CSRPE1A and CSIPE1A, respectively.

The binary ZERO outputs from each of the flip-flops are combined in an AND gate 201-810, the output of which is applied to a gate and inverter circuit 201-812 and to an AND gate 201-814. The circuit 201-812 forces signal CSARE10 to a binary ONE when any one of the error flip-flops 201-800 through 201-802 is switched to a binary ONE. The AND gate 201-814 combines the various types of control store errors and forces the output of an inverter circuit 201-816 to a binary ONE in response to an error. The error signals include control store parity errors detected by the circuits included as part of memory output register 201-16 (i.e., signals CSPER00 through CSPER60), control store addressing conditions (i.e., signal CSNEM00) in addition to the register parity error indicated by signal CSAER1A.

Data Section 210-8

FIG. 5f shows a portion of the data section 210-6. As indicated previously, the same arrangement of circuits is used to process the low order data bits 36-71 received from a second input multiplexer circuit, not shown.

Referring to FIG. 5f, it is seen that the section includes a group of three 36 bit labeled registers 210-900 through 210-902, BSY1, BSX1, and BSN1. The BSY1 and BSX1 registers are connected as inputs to another multiplexer circuit 210-904. The output of the circuit 210-904 is applied as source of A operand signals to an arithmetic and logic unit (ALU) 210-906. The BSN1 register serves as a source of B operand signals.

The output of the ALU 210-906 is applied to a bus BSZ and as inputs to each of the registers 210-900 through 210-902, as shown. Each of the registers also receives the output from multiplexer circuit 210-10. During the execution of group 3 microinstructions (MG310 = 1), the bit pair D1-D2 enables the delivery of the ALU output of similarity, the BSX1, BSY1, and BSN1 registers. The bit pair D5-D6 enables the delivery of the multiplexer circuit output (BSM1) to the BSX1, BSY1, and BSN1 registers when CSMG310 = 1.

DESCRIPTION OF OPERATION

The present invention will now be described with reference to FIGS. 6a and 6b. However, before referring to these figures, it is desirable to discuss to the extent necessary how the storage locations which constitute the scratch pad are allocated during the assembly of microprogram routines to be loaded into the control store 201-10.

Microprogram Assembler System

It will be appreciated that the microprograms to be loaded into the control store 201-10 are assembled by a register transfer level (RTL) assembler system. For the purposes of the present invention, this type of system can be considered conventional in design. Such systems are discussed in various papers, such as "RTL the Firmware Design Automation System", authored by Robert L. Hasterlik, published in the Eleventh Design Automation Workshop Proceedings, June 17-19, 1974.

The system makes use of a general purpose language which can be used for a wide variety of control store implementations. Parameters which form the basis of statements specify the control store/firmware implementation information about the specific design to the assembler system. Such parameters define the size of the control store or length, the width of the control (i.e., number of bits in each control store word), the fields of each word, etc.

The parameters pertinent to the present invention include the size of the control store which is declared as: ROMDEF, "ROM" name, "width" and "length". The "ROM name" is any valid name given to the control store for reference by other parameters. The "width" is the number of bits in each control store word. Here the value equals 36. The "length" is the number of words in the control store. Here the value equals 5120.

Each control store word is indicated by preceding its symbolic name by a dollar sign ($) symbol. Any symbolic code following the $ and before the next $ is assembled and placed within one control store word location. In general, word addresses are assigned by the assembler starting with zero and progressing sequentially for each control store word encountered. To alter this, the address may be set to a value other than the next sequential value by enclosing the desired value within parentheses immediately following the name of the control store word or word defining dollar sign. The address assignment then proceeds sequentially from the new value.

In accordance with the present invention, the control store LCSIK microinstruction words are coded to specify scratch pad locations. Each scratch pad location is designated as $SPA where "SPA" is the symbolic code or tag used to designate a scratch pad location.

A section of the assembler includes a dictionary or table where the control store microinstructions and their corresponding control store word structures are defined.

In the case of each tagged LCSIK microinstruction word, the word can be coded to specify a specific location such as having scratch pad location 1 ($SPA1) designated by address 5700. The scratch pad address included in the LCSIK microinstruction word is designated within the branch address field as ($SPA1). However, the control store word to be loaded into scratch pad location 1 would be designated $SPA1 (5700) no op;.

All scratch pad locations and unused control store locations will store a no op microinstruction bit pattern specified as an initial value (no op). Also each scratch pad location is assigned a separate tag address which reserves that address.

The following is an example of scratch pad location use during normal operation.

| CONTROL STORE SCRATCH PAD DIRECTORY (PERSONALITY LOAD) | |
|---|---|
| Octal Loc. | Contents |
| 05701 | CMPW(00-26) Control Mem. Pointer Word |
| 05702 | CMPW(09-35) |
| 05703 | 2/SSA Pointer Addr. |
| 05704 | BAR |
| 05705 | Size |
| 05706 | CSB Pointer Addr. |
| 05707 | Page Table Pointer |
| 05710 | Current CC Pointer |
| 05711 | Next CC Pointer |
| 05712 | Extra CC Word (00-26) |
| 05713 | Extra CC Word (09-35) |
| 05714 | First Word of Current CC |
| . | . |
| . | . |
| 05740 | Work Location #1 |
| 05741 | Work Location #2 |
| . | |
| . | |
| 05774 | S2P Memory Pointer |
| 05775 | S2P Memory Size |
| 05776 | Tally Timer Constant |
| 05777 | S2P State Parameters |

It is seen from the above that by just changing the coding of the $SPA (scratch pad reserving) microinstructions, you can alter the size of the scratch pad area. That is, the coding is modified to specify the loading of the CSI register 201-26 with a new address effectively defining another scratch pad or work location from the remaining group of unused locations. Hence, by coding such addresses in the LSCIK microinstructions themselves, the scratch pad area can be defined in the manner desired.

The assembler system assembles the symbolic data into the control store word. A load program formats the data for loading into the word organized alterable control store.

Figure 6A:
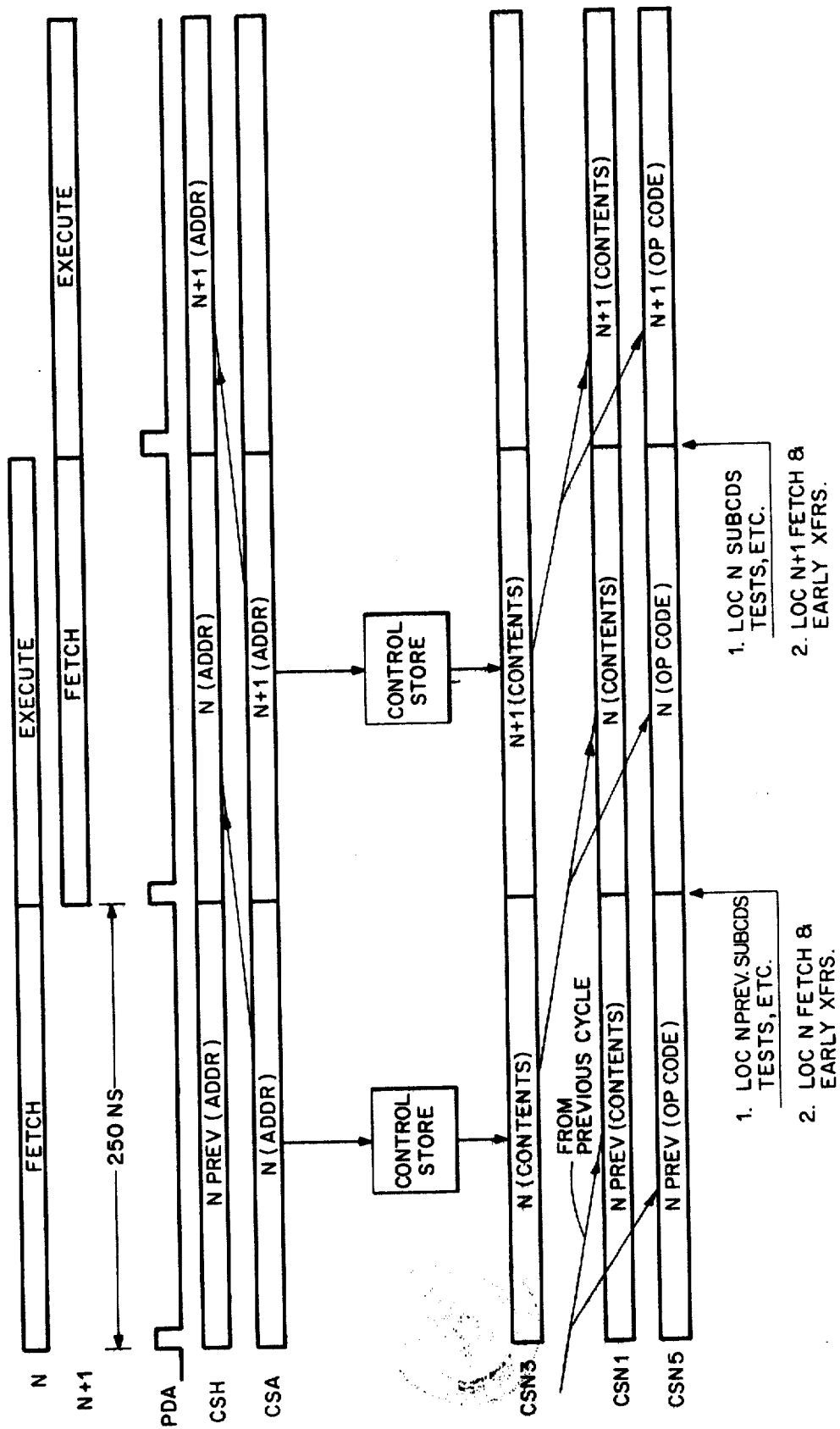

Before describing the operation of the system of FIG. 2, reference is first made to FIG. 6a. FIG. 6a illustrates diagrammatically the manner in which microinstruction fetch and execution operations are overlapped to ensure optimum performance. Referring to the figure, typical fetch and execution phases for two micro instructions, N and N+1, are shown.

It will be noted that each microinstruction is fetched from control store 201-10 and loaded into CSN1 memory local register 201-16 during the 250 nanosecond interval between PDA clock pulses. During this time, the address contained in the CSA register 201-12 is incremented by one and the contents of the CSH register 201-18 are updated. Upon the occurrence of the next clock pulse, the subcommands, branch conditions, ALU operations are performed. Simultaneously, during the second PDA clock pulse interval, the next microinstruction in sequence is fetched and loaded into the CSNI register 201-16. Also, during that time certain register transfers are performed during the fetching phase of the N+1 microinstruction in the case of certain microinstructions to further improve performance. For example, the transfers correspond to those made in response to the early transfer signals generated by the circuits of block 201-32 during the execution of certain group 6 and 7 microinstructions.

The arrangement of the present invention will now be described with reference to FIGS. 6b and 6c. The storage locations of control store 201-10 which form the scratch pad area are read from and written into in response to CSMR and CSMW, microinstructions, respectively. The CSMR and CSMW microinstructions prevent the contents contained in a scratch pad location from being interpreted as a microinstruction word. Rather such contents are treated as data which is read from or written into the location. FIGS. 6b and 6c respectively show the timing and control signals generated during the extraction and execution of CSMR and CSMW microinstructions. The "P" character designates the previous contents of certain registers (i.e., CSA, CSR, CSI, etc.).

Read Operation

Referring to FIG. 6b, during the first cycle, the CSA register 201-12 stores an address N which defines the location of the CSMR microinstruction. The CSI register 201-26 stores the address resulting from a previously executed LCSIK microinstruction or CSMW, CSMR microinstruction. This address is the scratch pad location. The op code CSN5 register 201-30 contains the op code of the microinstruction currently being executed.

During this cycle, transfer signal CSAFI10 loads the address in the CSI register 201-26 into the CSA register 201-12. Also, the address in CSA register 201-12 is incremented by one and stored in the CSI register in response to transfer signal CSIFB10 forced to a binary ONE by gate 201-217 (i.e., signals CSMG710·CSN0430). Thus, the address of the next microinstruction in the microprogram has been stored in the CSI register 201-26 and the scratch pad address to be read (previous contents of the CSI register 201-26) has been transferred to the CSA register 201-12.

During the next cycle, the signal CSHRS10 inhibits transfer signal CSAFB10 from loading CSA register 201-12 by circuit 201-20. Also, the signal forces transfer signal CSNFM90 to a binary ZERO which blocks normal register transfers and op code execution. Also, the CSHRS10 signal forces signal CSMG71A to a ZERO inhibiting early register transfers.

Also, during this cycle, the contents of the scratch pad location (1p) are read out from control store 201-10 into the latch circuits 201-16. However, since signal CSNFM90 is a ZERO, this forces the CSN5 register 201-30 to ZEROS. This blocks all normal register transfers, etc.

It should be noted that the LCSIK microinstruction loads the CSI register 201-26 during the fetching of the microinstruction (i.e., an early register transfer). This enables the system to execute an LCSIK microinstruction followed immediately by a CSMR or CSWR microinstruction and make use of the location specified by the LCSIK microinstruction.

The address previously stored in the CSI register 201-26 is returned to the CSA register 201-12 when transfer signal CSAFI10 is forced to a binary ONE. Also, as shown in FIG. 6b, the address stored in CSA register 201-12 is incremented by one and returned to CSI register 201-26 in response to transfer signal CSIFB10 being forced to a binary ONE.

During the second interval of execution, the contents of the addressed scratch pad location readout to the CSN1 register 201-16 are transferred through the multiplexer circuit 210-10 and loaded into the BSN1 register 210-902 of FIG. 5f. That is, bits P1 through P3 are set to "011" and delivery bits D5–D6 are set to "11" to cause the data contents to be transferred to the BSN1 register 210-902. The setting of bits P1–P3 and D5, D6 is accomplished by signal BSNFM10 which is forced to a binary ONE by the circuits of block 201-40 of FIG. 5g. The signal BSNFM10 is forced to a binary ONE via AND gate 201-704 in response to the CSMR microinstruction. Also, since signals CSGBI10 and CSGBI30 are binary ZEROS, this enables the decoding of group 6, 7, and 8 subcommands.

Since not all of the 36 bit contents are used for data (i.e., used for parity check bits), the check bits are forced to ZEROS and the entire word is rotated to the right by 9 bits. The shifting or rotation is accomplished by the multiplexer circuit 210-10 before the word is loaded into the BSN1 register 210-902. Before the data is written back into the scratch pad location during the execution of a write operation, it is preshifted to the left by 9 bits under microprogram control ("firmware").

Also, during this second interval, the op code of the next microinstruction word (N+1) is fetched and loaded into the CSN5 register 201-30 as seen from FIG. 6b. The signal CSIIC10 is forced to a binary ONE following signal CSNFM90 being switched to a binary ONE. The signal CSIIC10 inhibits the parity check circuit 201-44 from checking the parity of CSI register 201-26 until the next LCSIK microinstruction is fetched and executed. As mentioned, this is necessary because bit 31 in the scratch pad location could be incorrect due to modification by a previous CSMW microinstruction.

Write Operation

With reference to FIG. 6c, a write operation will now be described. A CSMW microinstruction causes data stored in the BSX1 register 210-901 of FIG. 5f to be written into a scratch pad location specified by the address contents of the CSI register 201-26 as explained herein. It is assumed that the CSMW microinstruction is stored in location N+1.

As mentioned in connection with the read operation, the CSI register 201-26 is loaded by a previously executed LCSIK microinstruction or result of a previous CSMR or CSMW microinstruction. As seen from FIG. 6c, during the fetching phase of the CSMW microinstruction, the CSA register 201-12 is loaded with the scratch pad address from the CSI register 201-26 in response to transfer signal CSAFI10. Also, the CSI register 201-26 is loaded with the return address (N+2) from CSB incrementing circuit 201-20 in response to transfer signal CSIFB10. As in the case of the read operation, the address contents of the CSH register 201-18 are updated.

During the first interval of execution of the CSMW microinstruction, the signals CSGBI10 and CSGBI30 are binary ZEROS which enables the decoding of subcommands from groups 6, 7, and 8. As seen from FIG. 6c, the circuits of block 201-15 in FIG. 5g generate write signals CSWRT1A and CSWRT1B which are combined to produce the control store write pulse CSWRT10. This signal is inverted before being applied to the control store circuits. Since the write pulse is generated during the occurrence of a clock pulse, when the data on the memory bus may not be valid, the operation of parity checking by circuits included as part of the latches of block 201-16, inhibited by signal CSWRT0A which is a binary ZERO.

Normally, the multiplexer circuit 201-904 of FIG. 5f has the BSX1 register 201-901 connected to the BSZ1 bus and therefore the signals previously loaded into that register are written into the scratch pad location. New parity bits are generated by the circuits of FIG. 5g if signal CSAHP10 is a binary ONE.

Also, during the first interval or cycle, the signal CSNFM90 is forced to a binary ZERO. As in the case of the read operation, this prevents the decoding of the previous scratch pad contents by forcing the CSN5 register 201-30 to ZEROS. By being set to ZEROS, the CSN5 register 201-30 also prevents interpretation (execution) of the new contents of scratch pad location as a microinstruction during the second interval of execution.

During the next interval (III) of execution, the address contents of the CSI register 201-25 are returned to the CSA register 201-12 in response to transfer signal CSAFI10. Simultaneously, the scratch pad address stored in the CSA register 201-12 is incremented by one and returned to the CSI register 201-26 in response to transfer signal CSIFB10. These signals are forced to binary ONES by the circuits of block 201-32 in response to signal CSHRS10 and CSWRT0A. The signal CSHRS10 also inhibits the parity check circuit 201-44 from checking the address contents of the CSI register 201-26 by forcing signal CSIIC10 to a binary ZERO. As in the case of a read operation, parity checking is inhibited on the CSI register 201-26 until another LCSIK microinstruction is fetched.

System Operation

From the above, it is how CSMR and CSMW microinstructions enable the reading and writing of information from and into control store scratch pad locations. The arrangement of the present invention facilitates the writing/reading of a number of scratch pad locations in sequence. An example is where the adapter 200 is required to store different type information when it begins execution of a channel command received from the host processor 100.

In response to a connect pulse, the adapter 200 initiates a sequence of operations for fetching a channel mailbox pointer word (CMPW), a channel mailbox block (CMB) and a channel command (CC) from main memory 150. The CMPW is used by the system to maintain synchronization during the initiation, execution and termination of a channel program. The CMPW includes a pointer which contains the absolute address of the first word of the CMB in main memory 150. The CMPW also is used to locate the first word of a channel program block CPB which includes "N" channel commands (CCs), each word coded to specify an operation to be performed in the adapter 200.

The CMB includes 8 words and is used by the adapter 200 to properly execute the channel program. It includes a pointer to a status saving area (SSA), base address register (BAR) value and other information. The status saving area contains the necessary information required by the adapter 200 to operate the S2P processor 300 and status information furnished by the adapter 200 during operation indicating S2P processor status (e.g. trapped). The BAR is a 24 bit absolute address which is used by the adapter 200 to convert all relative addresses to absolute addresses. The other information includes a pointer to the first word in a channel status block and a page table pointer to the start of a channel page table.

During the sequence of operations, the adapter 200 executes a series of CSMW microinstructions for storing in control store 201-10 the different pointer information into scratch pad locations which comprise in the control store scratch pad area. The scratch pad information is stored as illustrated previously by way of example. A LCSIK microinstruction is executed previous to the series of CSMW microinstructions which loads the CSA register 201-12 with the appropriate scratch pad starting address.

During each CSMW microinstruction, the CSI register 201-26 is incremented automatically after each write operation. As long as the scratch pad information is being written into successive storage locations, no further LSCIK microinstructions are required.

It will be appreciated that during the execution of the channel command, this may require the storage of additional information (e.g. addresses, data). The information would be again stored by means of executing further CSMW microinstructions together with LCSIK microinstructions. Here, the LCSIK microinstructions would be coded to specify scratch pad working location addresses.

When the adapter 200 completes execution of the stored channel command, it must fetch the next command from the CPB in main memory 150. Accordingly, it will execute a CSMR microinstruction which reads out the CC pointer from the appropriate scratch pad location of control store 201-10. Following the fetching of the next channel command, the adapter 200 then executes the required LCSIK and CSMW microinstructions which store signals representative of the fetched channel command.

From the above, it is seen how the arrangement of the present invention enables a single control store to serve a dual purpose. By either including additional load type microinstructions or modifying the addresses specified by such microinstructions, the scratch pad area can be expanded or reduced in size. More importantly, there is no need to make changes to the control store circuits when changes are made to modify the scratch pad area. The tagging of locations as part of the scratch pad area proceeds in the manner described previously.

It will be appreciated that the present invention reduces considerably the complexity of the control section in addition to simplifying the control and timing circuits of the section. Be reducing the number of circuits, this also facilitates testing and increases the reliability of the control section.

It will be obvious to those skilled in the art that many changes can be made to the preferred embodiment of the present invention. Such changes involve the coding and types of microinstructions employed.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A data processing system comprising a main store, said main store having a plurality of storage locations for storing data and commands of at least one program and a microprogrammed processing unit operatively coupled to said main store, said microprogrammed processing unit comprising:

a cycled addressable control store including a plurality of storage locations for storing microinstruction words of at least one microprogram referenced during the execution of one of said commands, each of said microinstruction words including a command code portion, a group of said plurality of storage locations storing words coded for reserving said locations for use as scratchpad storage and at least one of said microinstructions words being of a first type having a command code portion coded to specify the writing of data into said control store;

input means coupled to said main store and to said control store for receiving data being manipulated by said microprogrammed processing unit and fetched from said main store for storage in said control store;

an address register coupled to said control store for storing an address for referencing said plurality of storage locations;

an output register coupled to said control store for storing at least said command code portion of each said microinstruction word read out from each of said storage locations; and, decoder circuit means coupled to said output register and to said address register, said decoder circuit means being conditioned by said command code portion to generate a plurality of control signals for directing the operation of said microprogrammed processing unit, said decoder circuit means including first circuit means responsive to said one of said microinstruction words to generate signals for loading an address specifying a scratchpad location into said address register and for conditioning said control store to write said data from said input means into said scratchpad location.

2. The system of claim 1 wherein said decoder circuit means includes second circuit means responsive to said one of said microinstruction words to inhibit the transfer of said command code portion of the word read out from said scratchpad location to said output register enabling said word to be intepreted by said decoder circuit means as data and not as a microinstruction to be executed.

3. The system of claim 2 wherein said microprogrammed processing unit further includes a control address register coupled to said address register and to said control store;

said one microprogram including at least a second type of microinstruction stored in a predetermined one of said plurality of storage locations, said second type of microinstruction having a command code portion coded to specify an address transfer operation and an address portion coded to specify an address of one of said group of said plurality of storage locations; and, said decoder circuit means including means conditioned by the command code of said second type of microinstruction upon said command code being stored in said output register to generate signals for loading said address into said control address register, said decoder first circuit means being operative in response to said command code to generate said signals for loading said address into said address register.

4. The system of claim 3 wherein said microprogrammed processing unit further includes:
   an increment circuit coupled to said address register and to said control address register, said increment circuit for incrementing by one the address stored in said address register; and,
   said decoder circuit means generating signals in response to said one microinstruction to load said incremented address into said control address register simultaneously with the loading of said address register from said control address register thereby enabling data from said input means to be written into successive locations of said scratchpad storage of said control store.

5. The system of claim 4 wherein said one microprogram includes a series of said first type of microinstruction words, each having a command code portion coded to specify a write operand; and,
   said decoder circuit means being operative in response to each of said series of first type of microinstruction words to generate signals for writing data into successive locations of said scratchpad storage of said control store.

6. The system of claim 1 wherein each word of said group of said storage locations includes a command code portion coded to specify a no operation type microinstruction.

7. The system of claim 3 wherein said one microprogram includes a plurality of said second type of microinstructions, each said address portion being coded to specify new addresses thereby modifying the size of said scratchpad storage of said control store.

8. The system of claim 7 wherein said one microprogram includes an additional number of said second type of microinstructions for increasing the number of said scratchpad locations.

9. The system of claim 5 wherein said system includes a main store coupled to said microprogrammed processing unit, said decoder circuit means in response to each of said series of first type of microinstruction words generating signals for writing data from said input means received from said main store into said successive locations of said scratchpad storage of said control store.

10. A method of organizing a microprogrammed processing unit of a data processing system including a main store for facilitating the processing data transferred to and from said main store, said processing unit including a control store having a plurality of storage locations for storing microinstructions of a plurality of microprograms, an address register coupled to said control store for addressing said storage locations, an output register coupled to said control store for receiving at least a portion of the contents of an addressed storage location, decoding means coupled to said output register for generating control signals in response to a command code of each microinstruction word read out from each said addressed location, and a data section coupled to said main store, said control store and to said output register for transferring and receiving said data, said method comprising the steps of:
   a. writing initially into a number of said plurality of storage locations of said control store, information signals coded for indicating that each of said number is to be reserved for use as a scratchpad area;
   b. writing a first number of a first type of microinstruction word in other ones of said plurality of storage locations of said control store, each of said first number of microinstruction words being coded to specify when one of said plurality of reserved scratchpad locations is to be written into or read during the execution of said microprograms by said processing unit;
   c. generating a first group of signals by said decoder circuit means for loading an address of one of said scratchpad locations into said address register in response to the command code of one of said microinstructions; and,
   d. generating control signals by said decoding means in response to the command code of any one of said first number of said first type of microinstruction words for writing data from said data section into a scratchpad location designated by the contents of said address register and reading out the contents of said scratchpad location to said data section selectively in accordance with the coding of said command.

11. The method of claim 10 wherein said method further includes the step of:
   inhibiting the transfer of each of said first number of said first type of microinstruction words to said output register causing said output register to store binary ZEROS resulting in said decoding means decoding the contents of the addressed storage location as data and not as a microinstruction to be executed.

12. The method of claim 10 wherein said processing unit further includes a control address register coupled to said address register and to said control store, said method further including the steps of:
   writing a second number of a second type of microinstruction words in predetermined storage locations of said control store, each of said second number of microinstruction words being coded to specify an address of one of said scratchpad locations;
   generating signals by said decoding means in response to each of said second number of second type of microinstruction words for loading said address into said control address register; and,
   generating transfer signals by said decoding means in response to each of said first number of said first type of microinstruction words subsequently read from said control store for loading said address register with the address stored in said control address register.

13. The method of claim 12 wherein said processing unit includes an increment circuit coupled to said address register and to said control address register and wherein said method further includes the steps of:
   incrementing by one the address stored in said address register; and,
   generating signals by said decoding means in response to each of said first number of said first type of microinstruction words for loading of said incremented address into said control address register thereby enabling data to be read or written into successive storage locations of said scratchpad area.

14. The method of claim 13 further including the steps of:
   coding each one of a group of said second number of said second type of microinstruction words to specify a write operation; and,
   writing said group of said second number of said second type of microinstruction words in succession into said predetermined storage locations for enabling said microprogrammed unit to write data into said successive locations of said scratchpad area.

15. The method of claim 10 wherein step (a) further includes the step of initially storing in each of said number of scratchpad locations, a microinstruction word having a command code portion coded to specify a no operation type microinstruction.

16. The method of claim 12 wherein each one of said second number of second type of a microinstruction words includes a command code portion and an address portion coded to specify said address of one of said scratchpad locations, said command code portion being coded to condition said decoding means to generate said signals for loading said address into said address register.

17. The method of claim 16 further including the step of modifying said address portions of different ones of said second number of said second type of microinstruction words for altering the size of said scratchpad area.

18. The method of claim 16 further including the step of storing additional ones of said number of said second type of said microinstruction words for specifying an increased number of reserved storage locations.

19. The method of claim 14 wherein said data processing system includes a main store coupled to said data section of said microprogrammed processing unit, said method further including the step of:
generating signals by said decoding means in response to each of said first type of microinstruction words for conditioning said data section to apply data received from said main store to said control store for writing into said scratchpad locations.

20. A microprogrammed processing unit, said microprogrammed processing unit being coupled to a main store and comprising:
a cycled addressable control store including a plurality of storage locations for storing microinstruction words of a plurality of microprograms, each of said microinstruction words including a command code portion, a group of said plurality of storage locations storing signals for reserving said locations for use as a scratchpad and a number of said microinstruction words being of a first type each having a command code portion coded to specify writing or reading data form or into said control store;
input means coupled to said main store and to said control store for receiving data being manipulated by said microprogrammed processing unit and data fetched from said main store for storage in said control store;
address register means coupled to said store for storing an address for referencing said plurality of storage locations;
output register means coupled to said control store for storing at least said command code portion of each said microinstruction word read out from any one of said storage locations; and,
decoder circuit means coupled to said output register means, said decoder circuit means being conditioned by said command code portion to generate a plurality of control signals for directing the operation of said microprogrammed processing unit, said decoder circuit means including first circuit means responsive to any one of said first type of microinstruction words to generate signals for loading an address specifying a scratchpad location into said address register and for conditioning said control store for reading or writing data from said input means into said scratchpad location.

21. The system of claim 20 wherein said decoder circuit means includes second circuit means responsive to any one of said first type of microinstruction words to inhibit the transfer of said command code portion of the contents read out from said scratchpad location to said output register means enabling said contents to be interpreted by said decoder circuit means as data and not as a microinstruction to be executed.

22. The system of claim 21 wherein said microprogrammed processing unit further includes control address register means coupled to said address register means and to said control store; and,
wherein at least one of said plurality of microprograms includes a number of a second type of microinstruction words stored in a predetermined ones of said plurality of storage locations, each said second type of microinstruction word having a command code to specify a transfer operation and an address portion coded to specify an address of one of said group of locations; and
said decoder circuit means being conditioned by the command code of each of said second types of microinstructions to generate signals for loading said address into said control address register means, said first circuit means in response to said command code, generating said signals for loading said address into said address register means.

23. The system of claim 22 wherein said microprogrammed processing unit further includes:
increment circuit means coupled to said address register means to said control address register means, said increment circuit means for incrementing the address stored in said address register means;
said decoder circuit means generating signals in response to each said second type microinstruction word to load said incremented address into said control address register means simultaneously with the loading of said first address register means from said control address register means thereby enabling data from said input means to be written into successive locations of said scratchpad storage of said control store.

24. The system of claim 23 wherein at least one of said microprograms includes a series of microinstruction words of said first type, each having a command code portion coded to specify a write operation; and,
said decoder circuit means being operative in response to each of said series of first type of microinstruction words to generate signals for writing data into successive locations of said scratchpad storage.

25. The system of claim 23 wherein said microprogram includes a plurality of said second type of microinstruction words, each said address portion being coded to specify new addresses thereby modifying the size of said scratchpad storage.

* * * * *